US010436266B2

(12) United States Patent
Hester et al.

(10) Patent No.: US 10,436,266 B2
(45) Date of Patent: Oct. 8, 2019

(54) BRAKE MOUNTING HARDWARE WITH INTEGRATED AXLE VENT SYSTEM

(71) Applicant: Hendrickson USA, L.L.C., Itasca, IL (US)

(72) Inventors: Donald R. Hester, East Canton, OH (US); Benedetto A. Naples, Canton, OH (US)

(73) Assignee: Hendrickson USA, L.L.C., Itasca, IL (US)

(*) Notice: Subject to any disclaimer, the term of this patent is extended or adjusted under 35 U.S.C. 154(b) by 0 days.

(21) Appl. No.: 15/873,948

(22) Filed: Jan. 18, 2018

(65) Prior Publication Data

US 2018/0209496 A1 Jul. 26, 2018

Related U.S. Application Data

(60) Provisional application No. 62/448,457, filed on Jan. 20, 2017.

(51) Int. Cl.
*F16D 65/12* (2006.01)
*B60C 23/00* (2006.01)
*B60B 35/00* (2006.01)
*B60B 35/08* (2006.01)
*F16D 65/02* (2006.01)

(52) U.S. Cl.
CPC ............ *F16D 65/12* (2013.01); *B60B 35/006* (2013.01); *B60B 35/08* (2013.01); *B60C 23/003* (2013.01); *F16D 2065/1388* (2013.01)

(58) Field of Classification Search
CPC ............. F16D 2065/1388; F16D 65/12; B60C 23/003; B60B 35/08; B60B 35/006
See application file for complete search history.

(56) References Cited

U.S. PATENT DOCUMENTS

| 4,492,019 | A | * | 1/1985 | Wells | B60B 27/0031 |
| | | | | | 152/417 |
| 4,557,526 | A | | 12/1985 | Smith | |
| 5,174,839 | A | * | 12/1992 | Schultz | B60C 23/003 |
| | | | | | 152/415 |
| 5,538,330 | A | | 7/1996 | Ehrlich | |
| 6,145,558 | A | * | 11/2000 | Schmitz | B60C 23/003 |
| | | | | | 152/416 |

(Continued)

*Primary Examiner* — Xuan Lan Nguyen
(74) *Attorney, Agent, or Firm* — Dureska & Moore, LLC; David P. Dureska; David J. Danko

(57) ABSTRACT

A heavy-duty vehicle brake hardware mounting component that includes an integrated axle vent system and optional air supply line connector. The brake hardware mounting component includes a body with a central opening disposed around and rigidly attached to an axle of the vehicle. An annular groove is formed within the central opening and is in fluid communication with an axle opening. The air supply line connector is attached within an opening formed in the body and extends through the groove and into the axle opening, and enables attachment of and fluid communication between components of a tire inflation system within the axle and an external air source. Pressurized air from within the axle can flow through the axle opening, around the air supply line connector, through the annular groove, through a check valve in fluid communication with the groove, and to atmosphere to relieve air pressure build-up within the axle.

21 Claims, 14 Drawing Sheets

(56) References Cited

U.S. PATENT DOCUMENTS

| | | | |
|---|---|---|---|
| 6,199,611 B1* | 3/2001 | Wernick | B60C 23/003 |
| | | | 152/417 |
| 6,725,743 B2 | 4/2004 | White | |
| 8,915,274 B2* | 12/2014 | Eschenburg | B60C 23/003 |
| | | | 152/416 |
| 8,925,574 B2 | 1/2015 | Wilson et al. | |
| 9,879,738 B2 | 1/2018 | White et al. | |
| 2012/0067482 A1* | 3/2012 | Stech | B60C 23/003 |
| | | | 152/415 |
| 2012/0080573 A1* | 4/2012 | Fulton | B23P 11/00 |
| | | | 248/205.1 |

* cited by examiner

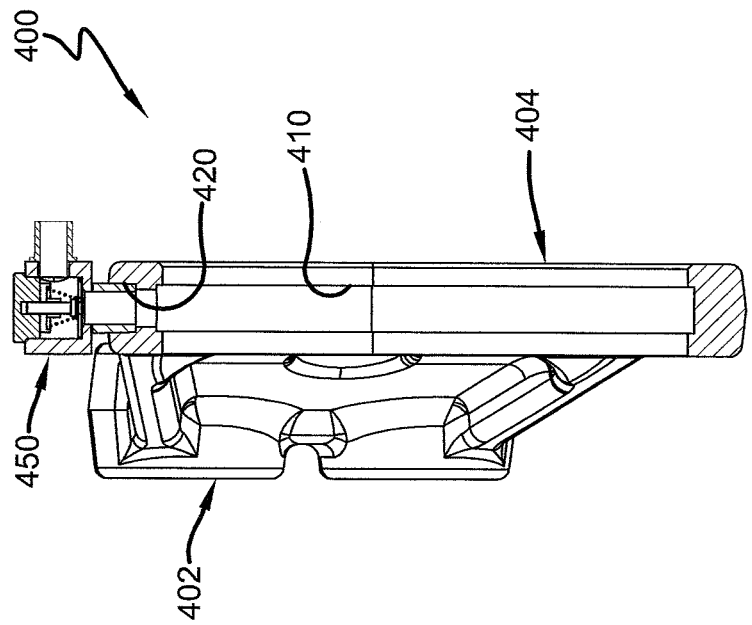
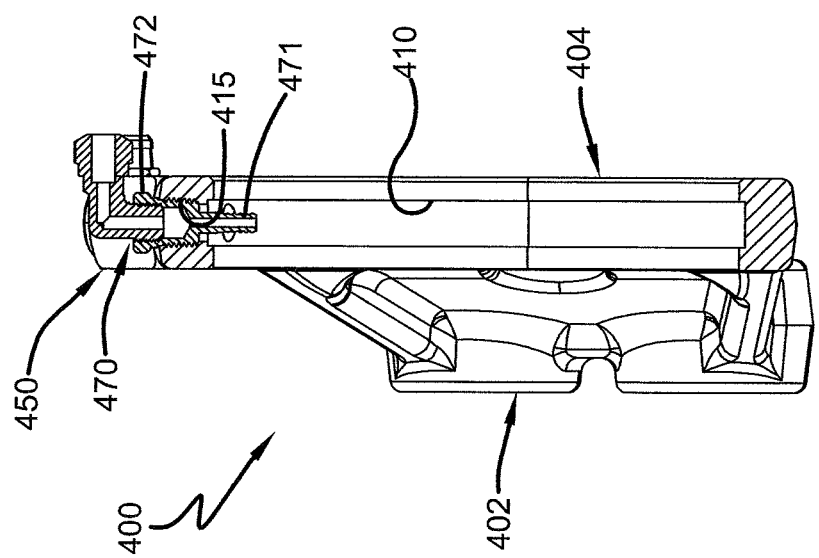
FIG. 15
FIG. 14

BRAKE MOUNTING HARDWARE WITH INTEGRATED AXLE VENT SYSTEM

CROSS-REFERENCE TO RELATED APPLICATION

This application claims the benefit of U.S. Provisional Patent Application Ser. No. 62/448,457, filed Jan. 20, 2017.

BACKGROUND OF THE INVENTION

Technical Field

The invention relates to vent systems for axles. More particularly, the invention relates to an axle vent system for heavy-duty vehicles. Still more particularly, the invention is directed to a brake hardware mounting component for heavy-duty vehicles with an integrated axle vent system that includes an annular groove, a check valve integrated into the brake mounting component, and an axle vent tube, all of which are in fluid communication with an interior chamber of an axle and cooperate to vent air pressure build-ups from within the axle to the atmosphere to extend the life of the components of the wheel end assembly. The brake hardware component also can incorporate a tire inflation system air supply line connector, whereby only two openings are required to be formed in an axle to accommodate the tire inflation and axle vent systems. Thus, the brake hardware mounting component with integrated axle vent system eliminates the need to drill/tap a separate opening in the axle to accommodate the axle vent system, thereby minimizing the machining required for the axle to accommodate installation of an axle vent system and increasing manufacturing efficiency, as well as decreasing manufacturing costs. In addition, the brake hardware mounting component with integrated axle vent system provides improved attachment of the axle vent system to a thin wall axle, greater flexibility in axle vent positioning, and better protection to components of the axle vent system.

Background Art

The use of trailing and leading arm rigid beam-type axle/suspension systems has been very popular in the heavy-duty truck and tractor-trailer industry for many years. Although such axle/suspension systems can be found in widely varying structural forms, in general their structure is similar in that each system typically includes a pair of suspension assemblies. In some heavy-duty vehicles, the suspension assemblies are connected directly to the primary frame of the vehicle. In other heavy-duty vehicles, the primary frame of the vehicle supports a subframe, and the suspension assemblies connect directly to the subframe. For those heavy-duty vehicles that support a subframe, the subframe can be non-movable or movable, the latter being commonly referred to as a slider box, slider subframe, slider undercarriage, or secondary slider frame. For the purpose of convenience and clarity, reference herein will be made to main members, with the understanding that such reference is by way of example, and that the present invention applies to heavy-duty vehicle axle/suspension systems suspended from main members of: primary frames, movable subframes and non-movable subframes.

Specifically, each suspension assembly of an axle/suspension system includes a longitudinally extending elongated beam. Each beam typically is located adjacent to and below a respective one of a pair of spaced-apart longitudinally extending main members and one or more cross members which form the frame of the slider or vehicle. More specifically, each beam is pivotally connected at one of its ends to a hanger which in turn is attached to and depends from a respective one of the main members of the vehicle. An axle extends transversely between and typically is connected by some means to the beams of the pair of suspension assemblies at a selected location from about the mid-point of each beam to the end of the beam opposite from its pivotal connection end. The beam end opposite the pivotal connection end also is connected to an air spring, or its equivalent, which in turn is connected to a respective one of the main members. A wheel end assembly is rotatably mounted on each outboard end of the axle. A brake system and typically one or more shock absorbers for providing damping to the axle/suspension system of the vehicle also are mounted on the axle/suspension system.

Axle vent systems have been utilized in heavy-duty vehicles to relieve pressure build-ups within the vehicle wheel ends and/or axles, particularly with vehicles that employ a tire inflation system. It is to be understood that the axle vent system of the present invention may be employed on heavy-duty vehicles that include tire inflation systems, and on heavy-duty vehicles that do not include tire inflation systems, and that reference herein made to heavy-duty vehicles with tire inflation systems is by way of example. Heavy-duty vehicles typically include trucks and tractor-trailers or semi-trailers. Tractor trailers and semi-trailers, which shall be collectively referred to as tractor-trailers for the purpose of convenience, include at least one trailer, and sometimes two or three trailers, all of which are pulled by a single tractor. All heavy-duty vehicles that are trucks or tractor-trailers include multiple tires, each of which is inflated with a fluid or gas, such as air, to an optimum or recommended pressure, which is known in the art as target pressure.

However, it is well known that air may leak from a tire, usually in a gradual manner, but sometimes rapidly if there is a problem with the tire, such as a defect or a puncture caused by a road hazard. As a result, it is necessary to regularly check the air pressure in each tire to ensure that the tires are not significantly below the target pressure and thus under-inflated. Alternatively, should an air check show that a tire is over-inflated, it is desirable to enable air to flow out of the tire to return it to the target pressure.

The large number of tires on any given heavy-duty vehicle setup makes it difficult to manually check and maintain the target pressure for each and every tire. This difficulty is compounded by the fact that trailers of tractor-trailers or trucks in a fleet may be located at a site for an extended period of time, during which the tire pressure might not be checked. Any one of these trailers or trucks might be placed in service at a moment's notice, leading to the possibility of operation with under-inflated or over-inflated tires. Such operation may increase the chance of less-than-optimum performance and/or reduced life of a tire in service as compared to operation with tires at the target pressure, or within an optimum range of the target pressure.

Moreover, should a tire encounter a condition as the vehicle travels over-the-road that causes the tire to become under-inflated, such as developing a leak from striking a road hazard, the life and/or performance of the tire may be significantly reduced if the under-inflation continues unabated as the vehicle continues to travel. Likewise, should a tire encounter a condition that causes it to become significantly over-inflated, such as increasing pressure from an increased ambient air temperature, the life and/or performance of the tire may be significantly reduced if the over-inflation continues unabated as the vehicle continues to travel. The potential for significantly reduced tire life typically increases in vehicles such as trucks or tractor-trailers that travel for long distances and/or extended periods of time, under such less-than-optimum inflation conditions.

Such a need to maintain the target pressure in each tire, and the inconveniences to the vehicle operator having to manually check and maintain a proper tire pressure that is at or near the target pressure, led to the development of tire inflation systems. In these systems, a target inflation pressure is selected for the vehicle tires. The system then monitors the pressure in each tire and attempts to maintain the air pressure in each tire at or near the target pressure by inflating the tire when the monitored pressure drops below the target pressure. These prior art tire inflation systems inflate the tires by providing air from the vehicle air supply to the tires by using a variety of different components, arrangements, and/or methods. Certain prior art systems are also capable of deflation, and these systems deflate the tires when the monitored pressure rises above the target pressure by venting air from the tires to the atmosphere.

One type of arrangement for tire inflation systems involves running a pneumatic supply conduit or line through the axle, which is hollow, to a rotary union that is mounted in the end of the axle spindle or on a hubcap of the wheel end assembly. The rotary union is an airtight rotating seal that enables fluid communication between the non-rotating axle and the rotating tire. Should the supply line experience a leak, air pressure may build up in the hollow axle and the wheel end assembly. If the pressure build-up remains unrelieved, components of the wheel end assembly may be damaged.

More particularly, the wheel end assembly typically includes a wheel hub that is rotatably mounted on a bearing assembly, which in turn is immovably mounted on the outboard end of the axle, commonly known as the axle spindle. The bearing assembly includes an inboard bearing and an outboard bearing, which may be separated by a bearing spacer. An axle spindle nut assembly secures the bearing assembly on the axle spindle by threadably engaging threads that are cut into the outer diameter of the outboard end of the axle spindle.

As is well known to those skilled in the art, for normal operation of the wheel end assembly to occur, the bearing assembly and surrounding components must be lubricated with grease or oil. Therefore, the wheel end assembly also must be sealed to prevent leakage of the lubricant, and also to prevent contaminants from entering the assembly, both of which could be detrimental to its performance. More specifically, a hubcap is mounted on an outboard end of the hub adjacent to and outboard from the axle spindle nut assembly, and a main seal is rotatably mounted on an inboard end of the hub in abutment with the axle spindle, resulting in a closed or sealed wheel end assembly.

In the event of a tire inflation system supply line or rotary union leak, there may be a relatively high build-up in air pressure inside the axle and/or wheel end assembly. Such an air pressure build-up may damage the wheel end assembly main seal. If the main seal becomes damaged, it may allow loss of the bearing lubricant, which in turn may undesirably reduce the life of the bearings and/or other components of the wheel end assembly.

In addition, relatively low air pressure build-ups may occur inside an axle and/or wheel end assembly of a heavy-duty vehicle that includes a tire inflation system, and of a heavy-duty vehicle that does not include a tire inflation system. Such low build-ups in air pressure may occur due to any one of multiple causes, such as an increase in ambient temperature, dynamic heating of the components of the wheel end assembly as the vehicle travels, changes in atmospheric pressure when the vehicle travels over roads with significant altitude changes, or a small leak in a supply line if a tire inflation system is employed. Even such relatively low build- and/or life of the main seal, which in turn may undesirably reduce the life of the bearings and/or other components of the wheel end assembly.

As a result, it is often desirable to provide an axle and/or wheel end assembly with means that enables relief of such build-ups of air pressure by venting or exhausting air to atmosphere. Ideally, in order to prevent damage to the wheel end assembly main seal, such means are capable of exhausting air at low pressure to relieve low build-ups of air pressure in the axle and/or wheel end assembly that are due to increases in ambient temperature, dynamic heating of the wheel end assembly, changes in atmospheric pressure, and/or small leaks in a tire inflation system. In addition, to enable relief of high pressure build-ups to adequately vent the axle and/or wheel end assembly in the event of a tire inflation system supply line or rotary union leak and thus prevent damage to the wheel end assembly main seal, such means is also ideally capable of venting or exhausting air at high pressure.

Moreover, when venting or exhausting an air pressure build-up to atmosphere from an axle and/or wheel end assembly, contaminants may be introduced into the wheel end assembly, which may undesirably reduce the life of the bearings and/or other components of the assembly. Therefore, it is also desirable to reduce or minimize the ability of contaminants to enter the wheel end assembly through any vent or exhaust system.

Various prior art axle vent devices have been incorporated into the axle to relieve excessive air pressure build-ups within the axle and/or wheel end assembly. For example, one known prior art axle vent device, which is shown and described in U.S. Pat. No. 8,925,574, and which is assigned to Applicant of the present invention, Hendrickson USA, L.L.C., includes a one way check valve which is threadably attached to a corresponding threaded opening drilled/tapped into the axle. The check valve is in fluid communication with an interior chamber of the axle. The check valve is also attached to a flexible exhaust tube outside of the axle. When a low pressure or high pressure air build-up occurs within the interior chamber of the axle, air is selectively vented from the interior chamber of the axle through the check valve and the exhaust tube to atmosphere.

Such axle vent devices, while satisfactorily performing their intended function, have various drawbacks and/or are susceptible to numerous potential issues. In such axle vent devices, an opening separate from the tire inflation system air hose openings generally must be drilled/tapped, or machined, into the axle at a low stress location on the axle to accommodate attachment of components of the axle vent device, which increases axle machining required to accommodate attachment of such devices.

With reference to axle/suspension systems which do not utilize an axle wrap system to attach the axle to the axle/suspension system beams, such as with a floating axle or an axle/suspension system which utilizes crimped wraps to attach the axle/suspension system beams to the axle, the axle vent device opening is typically formed at a position of low stress on the axle, such as on top of and near the center of the axle, with components of the axle vent device attached thereto. Such positioning of the axle vent device provides minimal protection to components of the axle vent device, which can be damaged by road debris and contaminants.

With specific reference to axle/suspension systems which utilize a thin walled axle, or an axle having a thickness of less than about 0.5 inches, because prior art axle vent devices typically threadably engage a separate opening drilled/tapped into an axle of its respective heavy-duty vehicle axle/suspension system to attach the axle vent device to its respective axle, in axle/suspension systems which utilize a thin walled axle, there is generally less threading for the axle vent device to engage, which can possibly result in a less secure attachment of the axle vent device as compared to attachment to axles of heavy-duty vehicle axle/suspension systems which utilize thicker axles.

Thus, there is a need in the art for an axle vent system that minimizes or eliminates openings drilled/tapped into the axle in order to accommodate attachment of axle vent system components to the axle of the heavy-duty vehicle to relieve pressure build-ups in the axle and/or the wheel end assembly. There is also a need in the art to minimize the machining required for the axle to accommodate installation of an axle vent system to increase manufacturing efficiency, as well as decrease manufacturing costs. In addition, there is a need in the art for an axle vent system which provides improved attachment of the axle vent system to a thin wall axle, greater flexibility in axle vent positioning, and greater protection to components of the axle vent system. The brake hardware mounting component for heavy-duty vehicles with an integrated axle vent system of the present invention satisfies these needs, as will be described below.

BRIEF SUMMARY OF THE INVENTION

An objective of the present invention includes providing an axle vent system that minimizes openings drilled/tapped into a heavy-duty vehicle axle to accommodate the axle vent system.

Another objective of the present invention is to provide an axle vent system that minimizes the machining required for an axle to accommodate installation of the axle vent system to increase manufacturing efficiency and decrease manufacturing costs.

Yet another objective of the present invention is to provide an axle vent system that provides improved attachment to thin walled axles.

Still another objective of the present invention is to provide an axle vent system that provides greater flexibility in axle vent positioning.

Yet another objective of the present invention is to provide an axle vent system that enables better protection to components of the axle vent system during operation of the vehicle.

These objectives and others are achieved by the brake hardware mounting component with integrated axle vent system of the present invention, which includes a body, the body including a central opening through which an axle of an axle/suspension system is disposed, the body being rigidly attached to said axle, the body providing a structure to mount components of a brake system; and an axle vent system integrated into the body, the axle vent system being in fluid communication with an interior chamber of the axle and enabling pressurized air from the axle interior to be vented to atmosphere.

BRIEF DESCRIPTION OF THE SEVERAL VIEWS OF THE DRAWINGS

The preferred embodiments of the present invention, illustrative of the best mode in which Applicant has contemplated applying the principles of the present invention, are set forth in the following description and are shown in the drawings.

Figure 11:
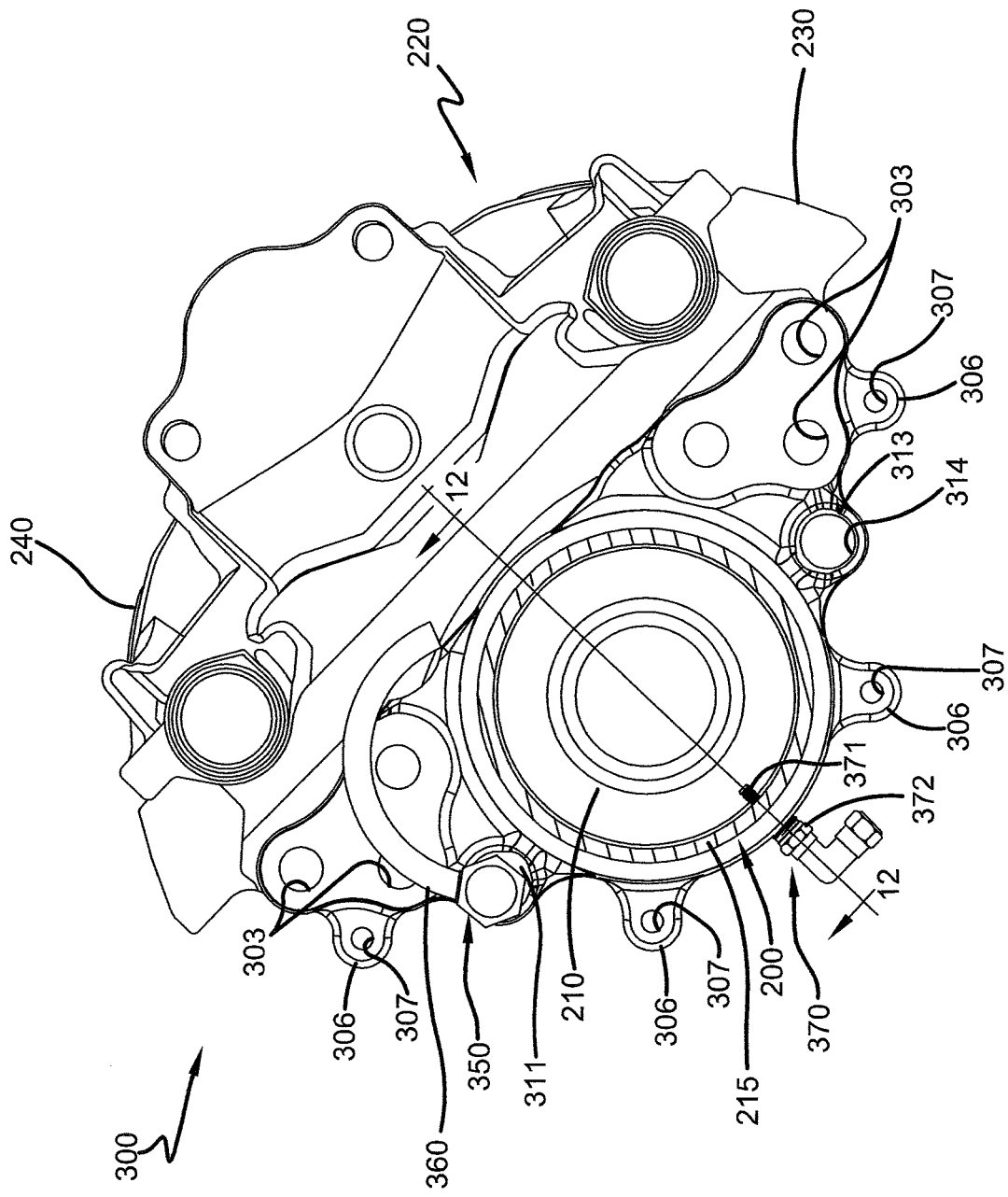
FIG. 11 is an elevational view, looking in the outboard direction, of the second preferred embodiment brake hardware mounting component with integrated axle vent system and tire inflation system air supply line connector of FIG. 8 attached to an axle of an axle/suspension system, shown in cross-section, and having brake components attached thereto.
Figure 12:
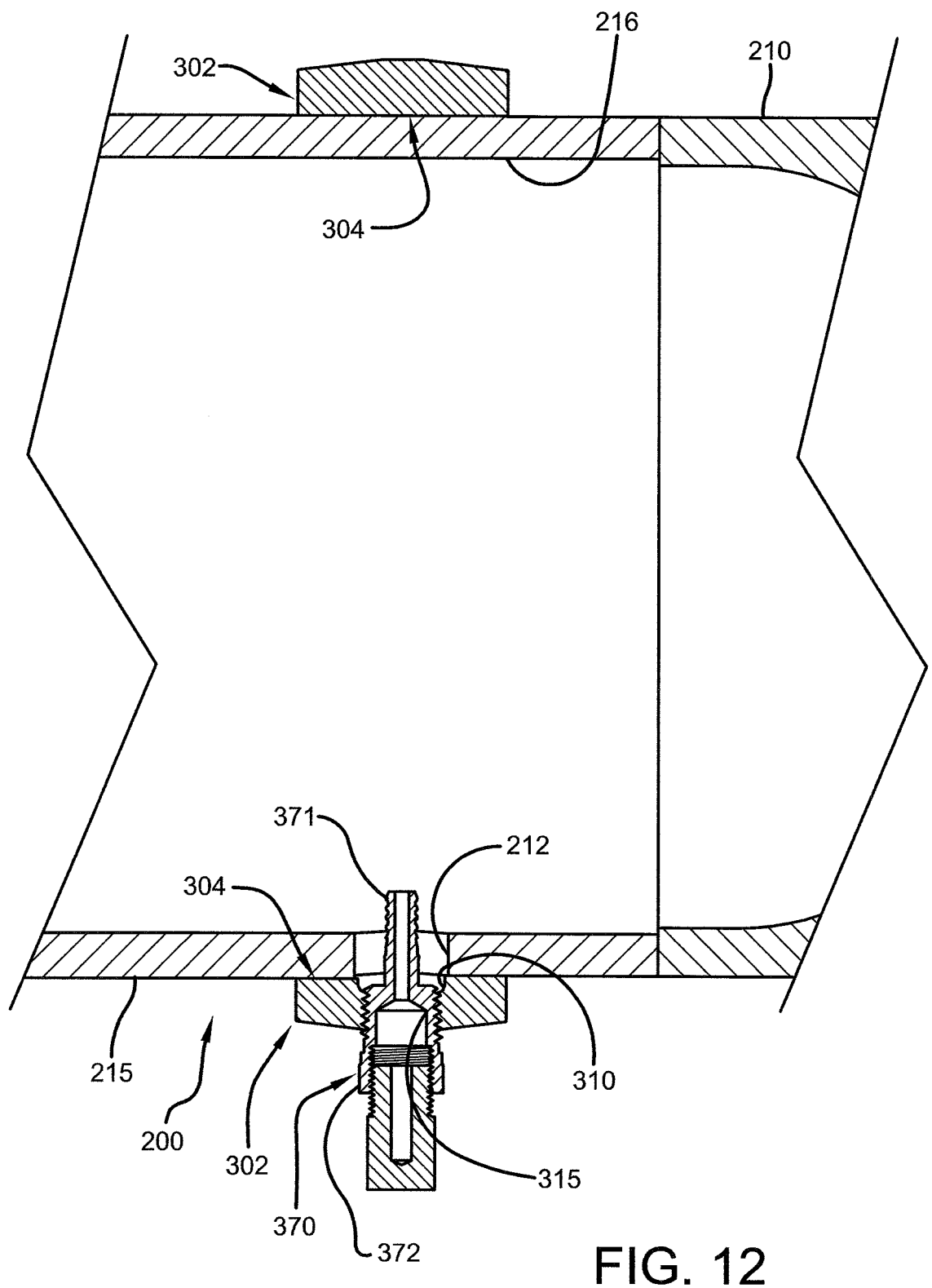
Figure 13:
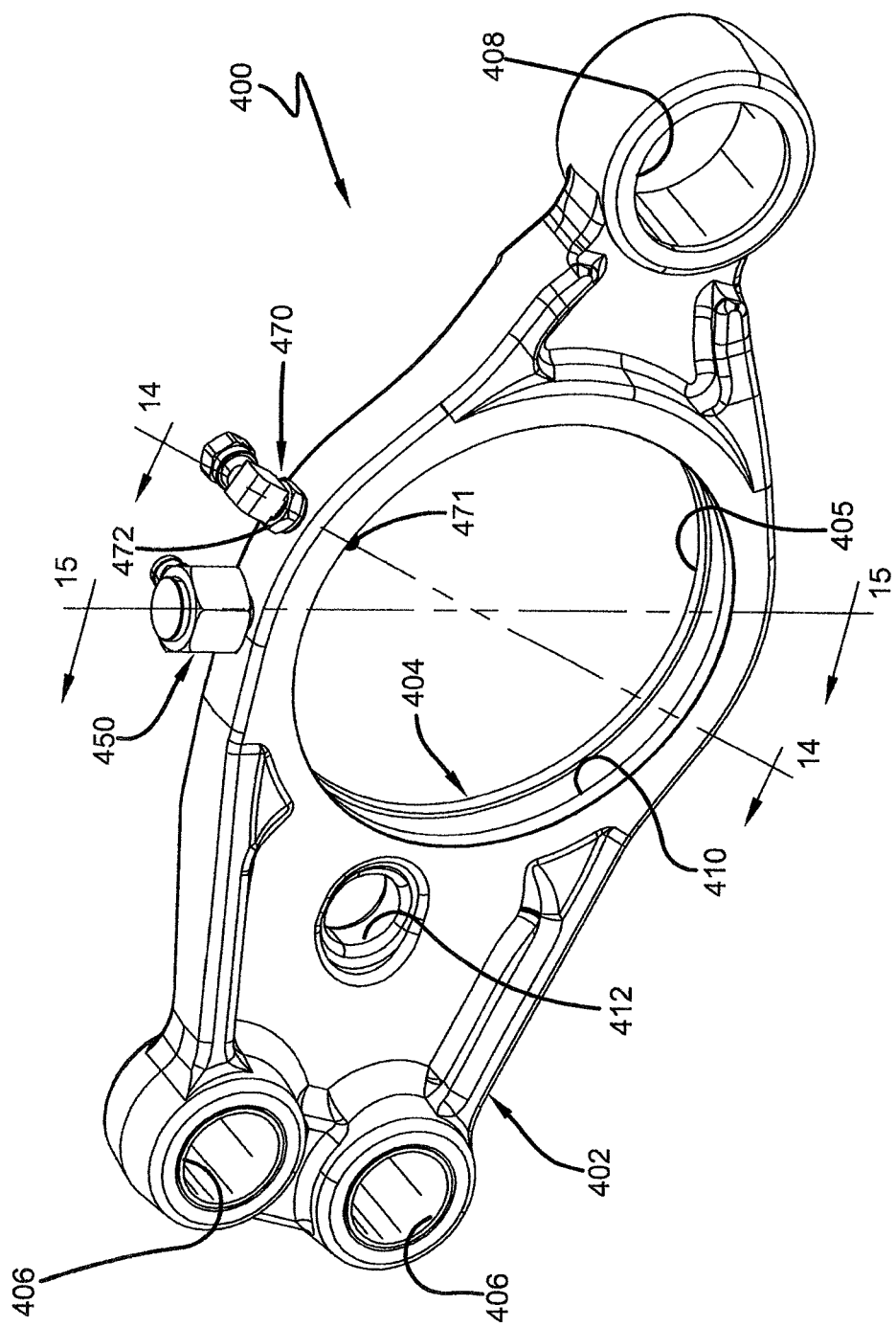
Figure 16:
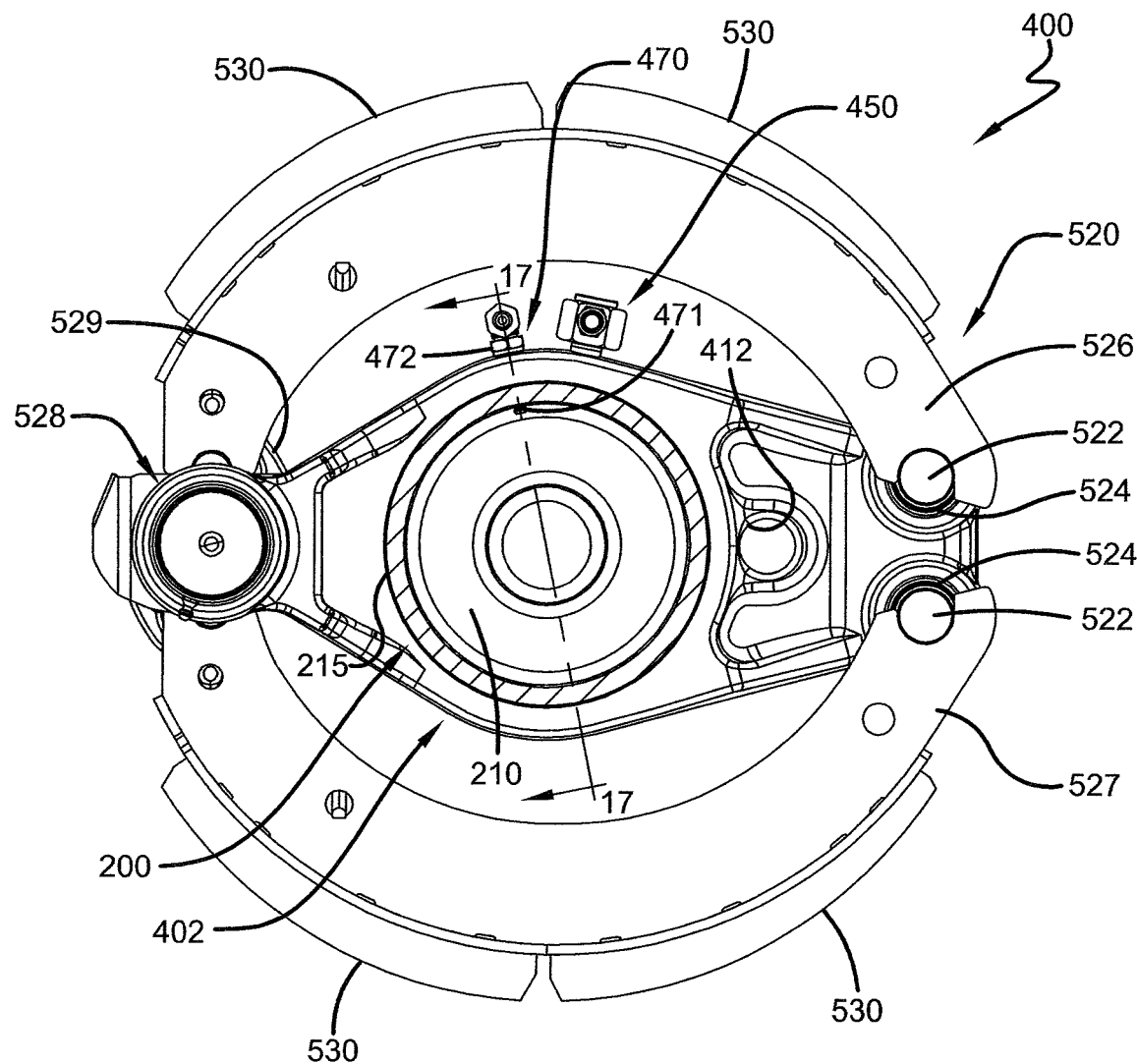
Figure 17:
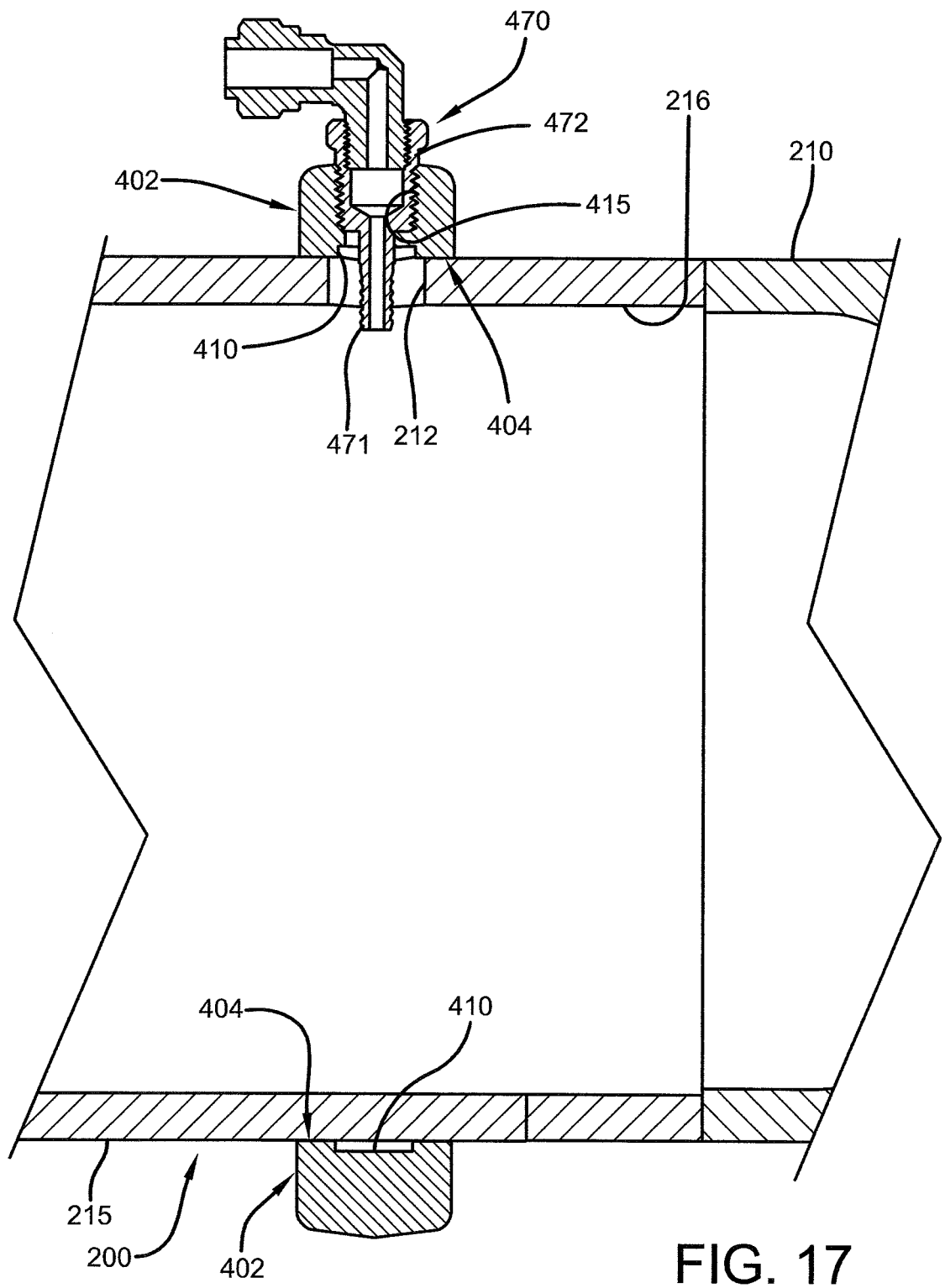

FIG. 12 is a fragmentary cross-sectional view of a portion of the axle and the second preferred embodiment brake hardware mounting component with integrated axle vent system and tire inflation system air supply line connector of FIG. 11, taken along line 12-12, and showing the orientation and mounting of components of the second preferred embodiment brake hardware mounting component with integrated axle vent system and tire inflation system air supply line connector relative to the axle;

FIG. 13 is a perspective view, looking in the inboard direction, of a third preferred embodiment brake hardware mounting component with integrated axle vent system and having an optional tire inflation system air supply line connector of the present invention;

FIG. 14 is a cross-sectional view of the third preferred embodiment brake hardware mounting component with integrated axle vent system and tire inflation system air supply line connector of FIG. 13, taken along line 14-14;

FIG. 15 is a cross-sectional view of the third preferred embodiment brake hardware mounting component with integrated axle vent system and tire inflation system air supply line connector of FIG. 13, taken along line 15-15;

FIG. 16 is an elevational view, looking in the outboard direction, of the third preferred embodiment brake hardware mounting component with integrated axle vent system and tire inflation system air supply line connector of FIG. 13 attached to an axle of an axle/suspension system, shown in cross-section, and having brake components attached thereto; and FIG. 17 is a fragmentary cross-sectional view of a portion of the axle and the third preferred embodiment brake hardware mounting component with integrated axle vent system and tire inflation system air supply line connector of FIG. 16, taken along line 17-17, and showing the orientation and mounting of components of the third preferred embodiment brake hardware mounting component with integrated axle vent system and tire inflation system air supply line connector relative to the axle.

Similar numerals refer to similar parts throughout the drawings.

DETAILED DESCRIPTION OF THE INVENTION

Figure 1:
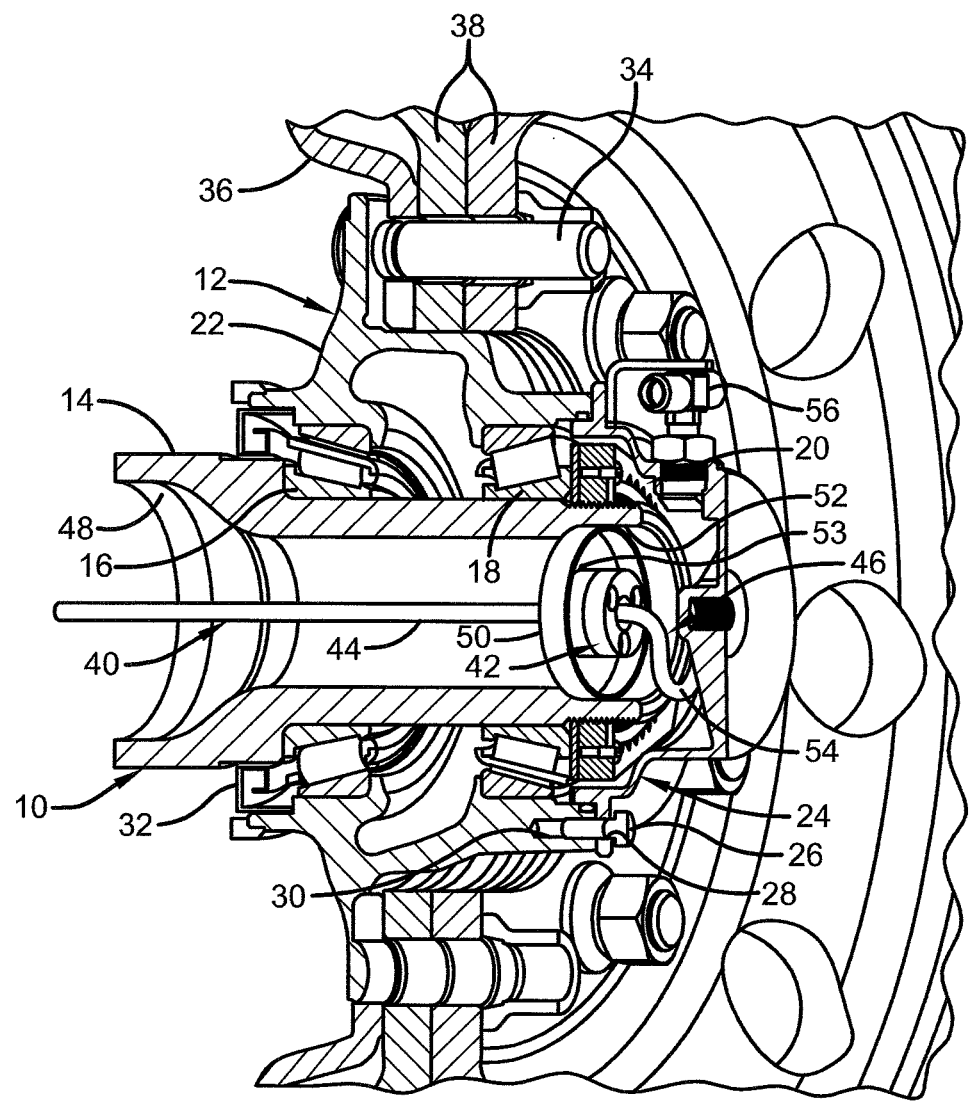
FIG. 1 is a fragmentary cross-sectional perspective view of a portion of an axle and a wheel end assembly, having certain components of a tire inflation system mounted thereon, and a brake drum and tire rims mounted on the hub of the wheel end assembly.
Figure 2:
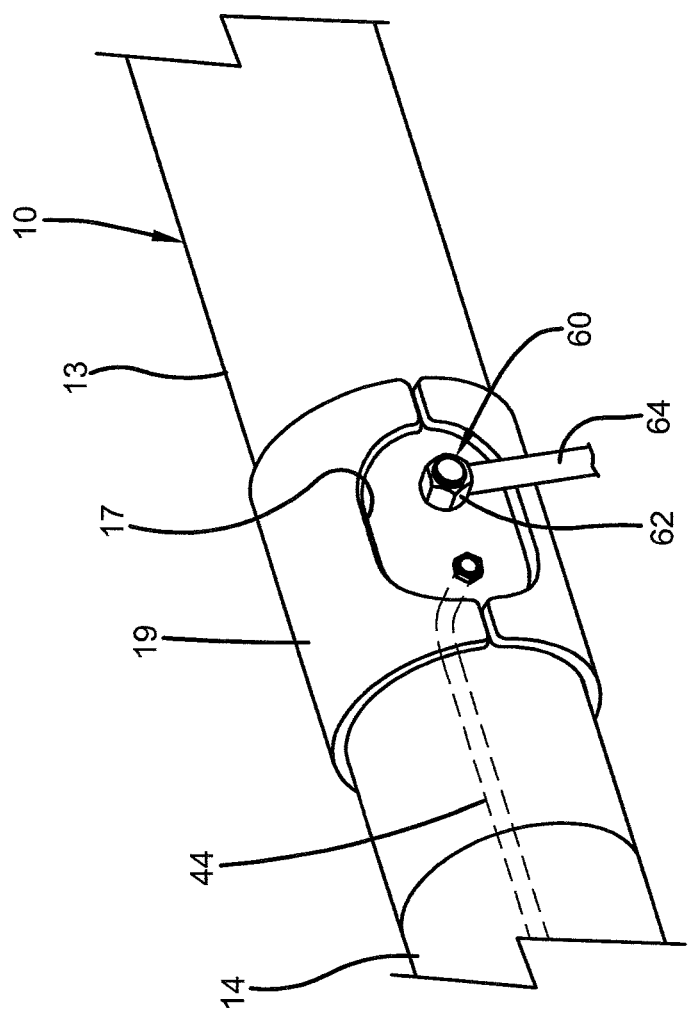
FIG. 2 is a fragmentary perspective view of a portion of the axle of FIG. 1, with certain components of a tire inflation system and a prior art tire inflation system axle vent device mounted thereon, with hidden components shown in dashed lines.

In order to better understand the brake hardware mounting component with integrated axle vent system of the present invention and the environment in which it operates, the components of a prior art tire inflation system and prior art axle vent device, and the vehicle structures on which they are mounted, are shown in FIGS. 1 and 2, and will now be described.

The brake hardware mounting component with integrated axle vent system of the present invention is utilized in conjunction with a heavy-duty vehicle axle/suspension system (not shown). Although heavy-duty vehicle axle/suspension systems can be found in widely varying structural forms, in general their structure is similar in that each axle/suspension system typically includes a pair of suspension assemblies (not shown). Each suspension assembly of an axle/suspension system includes a longitudinally extending elongated beam (not shown). Each beam typically is located adjacent to and below a respective one of a pair of spaced-apart longitudinally extending main members (not shown) and one or more cross-members (not shown) which form the frame of the slider or vehicle. More specifically, each beam is pivotally connected at one of its ends to a hanger (not shown) which in turn is attached to and depends from a respective one of the main members of the vehicle. An axle 10 extends transversely between and typically is connected by some means to the beams of the pair of suspension assemblies at a selected location from about the mid-point of each beam to the end of the beam opposite from its pivotal connection end. Axle 10 includes a central tube 13 (FIG. 2), and an axle spindle 14 is integrally connected, by any suitable means such as welding, to each end of the central tube. A wheel end assembly 12 is rotatably mounted on the outboard end of each one of axle spindles 14. For the purposes of convenience and clarity, only one end of axle 10 and its respective wheel end assembly 12 will be described herein. A brake system (not shown) and typically one or more shock absorbers (not shown) for providing damping to the axle/suspension system of the vehicle also are mounted on the axle/suspension system.

Wheel end assembly 12 includes an inboard bearing assembly 16 and an outboard bearing assembly 18 immovably mounted on the outboard end of axle spindle 14. A spindle nut assembly 20 threadably engages the outboard end of axle spindle 14 and secures inboard bearing assembly 16 and outboard bearing assembly 18 in place. A wheel hub 22 is rotatably mounted on inboard and outboard bearing assemblies 16, 18 in a manner well known to those skilled in the art.

A hub cap 24 is mounted on the outboard end of wheel hub 22 by a plurality of bolts 26, each one of which passes through a respective one of a plurality of openings 28 formed in the hub cap, and threadably engages a respective one of a plurality of aligned threaded openings 30 formed in the wheel hub. In this manner, hub cap 24 closes the outboard end of wheel end assembly 12. A main continuous seal 32 is rotatably mounted on the inboard end of wheel end assembly 12 and closes the inboard end of the assembly. In a typical heavy-duty vehicle dual wheel configuration, a plurality of threaded bolts 34 are used to mount brake drum 36 and a pair of tire rims 38 on wheel end assembly 12. Each one of a pair of tires (not shown) is mounted on a respective one of tire rims 38, as is known in the art.

A prior art tire inflation system integrated into axle 10 and wheel end assembly 12 is indicated generally at 40. A central bore 48 is formed in axle 10, though which a pneumatic conduit 44 of tire inflation system 40 extends toward an outboard end of axle spindle 14. Pneumatic conduit 44 is fluidly connected to and extends between the vehicle air supply, such as an air tank (not shown), and a rotary union 42. Rotary union 42 is attached to a plug 50 that is press-fit in a machined counterbore 52 formed in central bore 48 at an outboard end of axle spindle 14, and as known in the art, facilitates the connection of pneumatic conduit 44 to an air tube assembly 46, which rotates with the tire. Plug 50 is formed with an opening 53, which is known in the art as a breather hole, and allows fluid communication between central bore 48 and wheel end assembly 12.

Air tube assembly 46 includes a first tube 54 that is fluidly connected at one of its ends to rotary union 42 inside hub cap 24, and is fluidly connected at the other of its ends to a tee fitting 56, which passes through the hub cap and is secured to the hub cap. Additional air tubes (not shown) are fluidly connected to and extend from each one of two outlets of tee fitting 56 outside of hub cap 24 to each one of a respective pair of tires mounted on tire rims 38. With reference to FIG. 2, pneumatic conduit 44 is connected to an air hose (not shown), which is in turn attached to the vehicle air tank via an opening (not shown) drilled/tapped into axle 10 within a window 17 formed in an axle wrap 19 in a manner well known in the art. During operation of tire inflation system 40, air passes from the vehicle air tank, through the air hose, pneumatic conduit 44, rotary union 42, first tube 54, hub cap 24 and tee fitting 56, and into the tires.

With continued reference to FIG. 2, a prior art axle vent device 60 is incorporated into axle 10. Axle vent device 60 is typically employed in conjunction with tire inflation system 40 to relieve high pressure air build-ups which may form within axle 10 and potentially damage inboard bearing assembly 16 and outboard bearing assembly 18 and/or other components of wheel end assembly 12 as a result of a leak formed in the plumbing of the tire inflation system, such as in pneumatic conduit 44 or rotary union 42. In addition, axle vent device 60 relieves low pressure air build-ups within axle 10 which may form as a result of increases in ambient temperature, dynamic heating of the wheel end assembly, changes in atmospheric pressure, and/or small leaks in tire inflation system 40. Axle vent device 60 generally includes a one-way check valve 62 that is attached directly to axle 10, and a vertically downwardly extending flexible exhaust tube 64 that is fluidly connected to the check valve. To mount check valve 62 on axle 10, a threaded opening (not shown) is formed in the wall of the axle, and the check valve threadably engages the axle wall opening. Check valve 62 is mounted on axle 10 within window 17 adjacent to the opening through which pneumatic conduit 44 of tire inflation system 40 is connected to the vehicle air tank air hose. When a high pressure or low pressure build-up occurs within the interior of axle 10, air is vented from the interior of the axle through check valve 62 and exhaust tube 64 to atmosphere.

Figure 5:
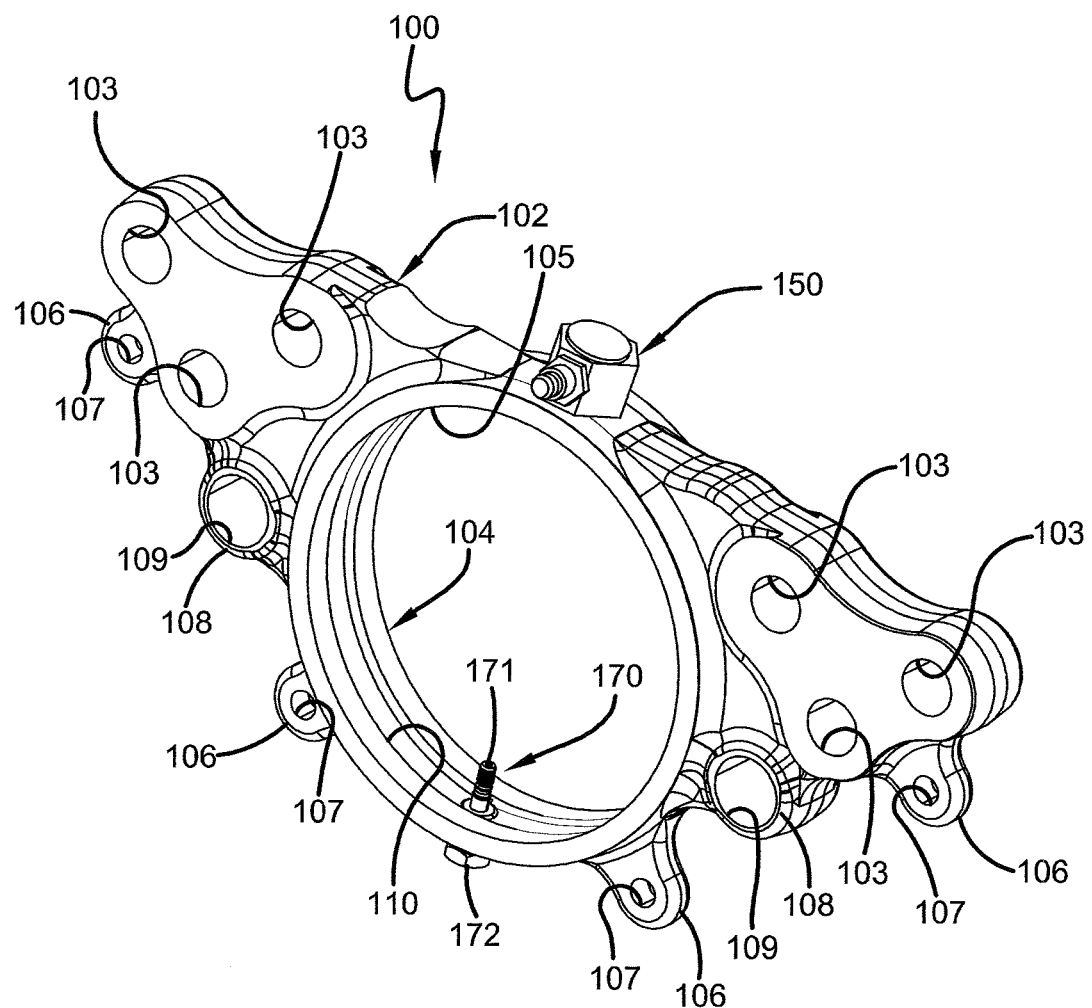
FIG. 5 is a perspective view, looking in the outboard direction, of a first preferred embodiment brake hardware mounting component with integrated axle vent system and having an optional tire inflation system air supply line connector of the present invention.
Figure 6:
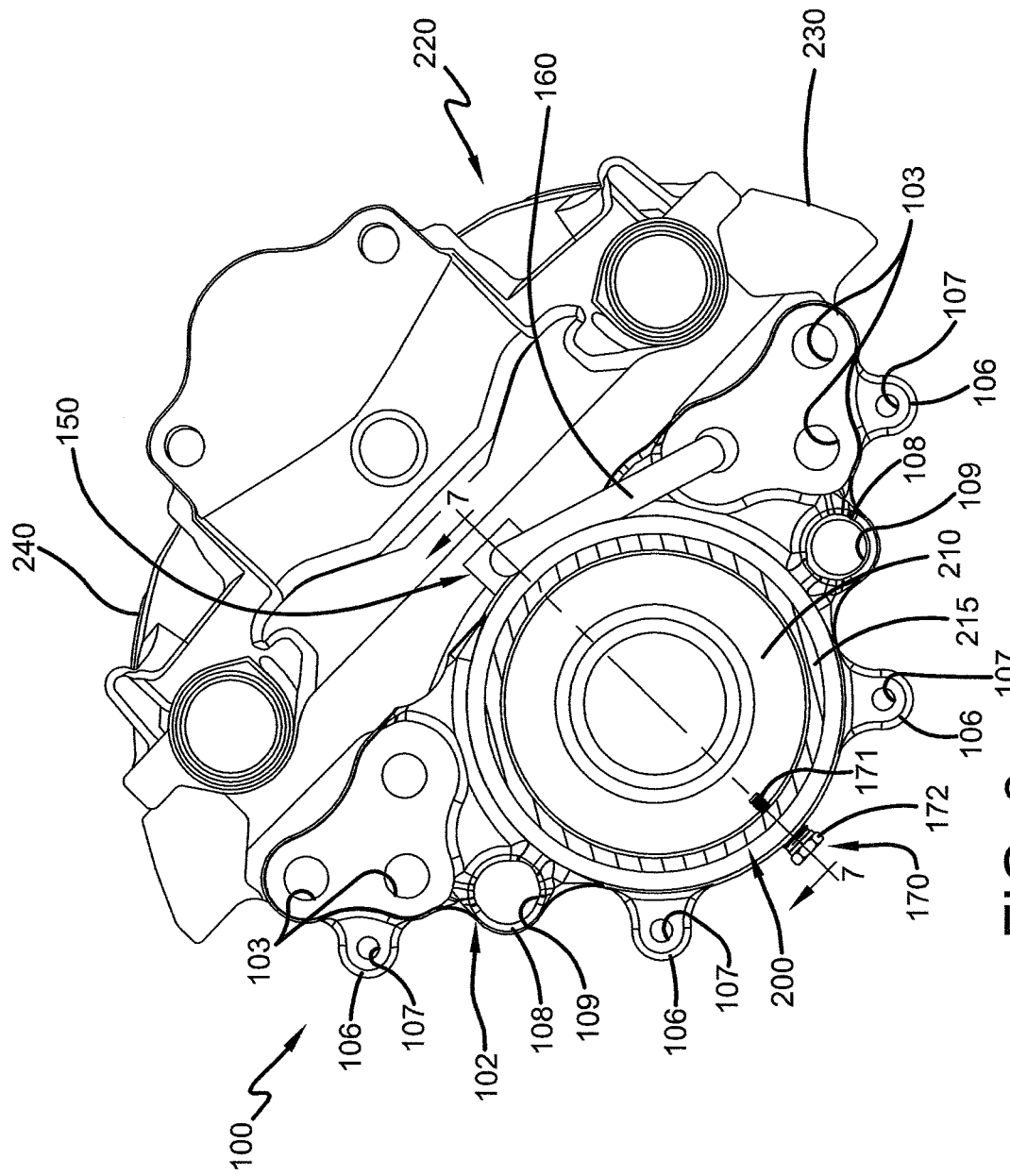
FIG. 6 is an elevational view, looking in the outboard direction, of the first preferred embodiment brake hardware mounting component with integrated axle vent system and tire inflation system air supply line connector of FIG. 5 attached to an axle of an axle/suspension system, shown in cross-section, and having brake components attached thereto.
Figure 7:
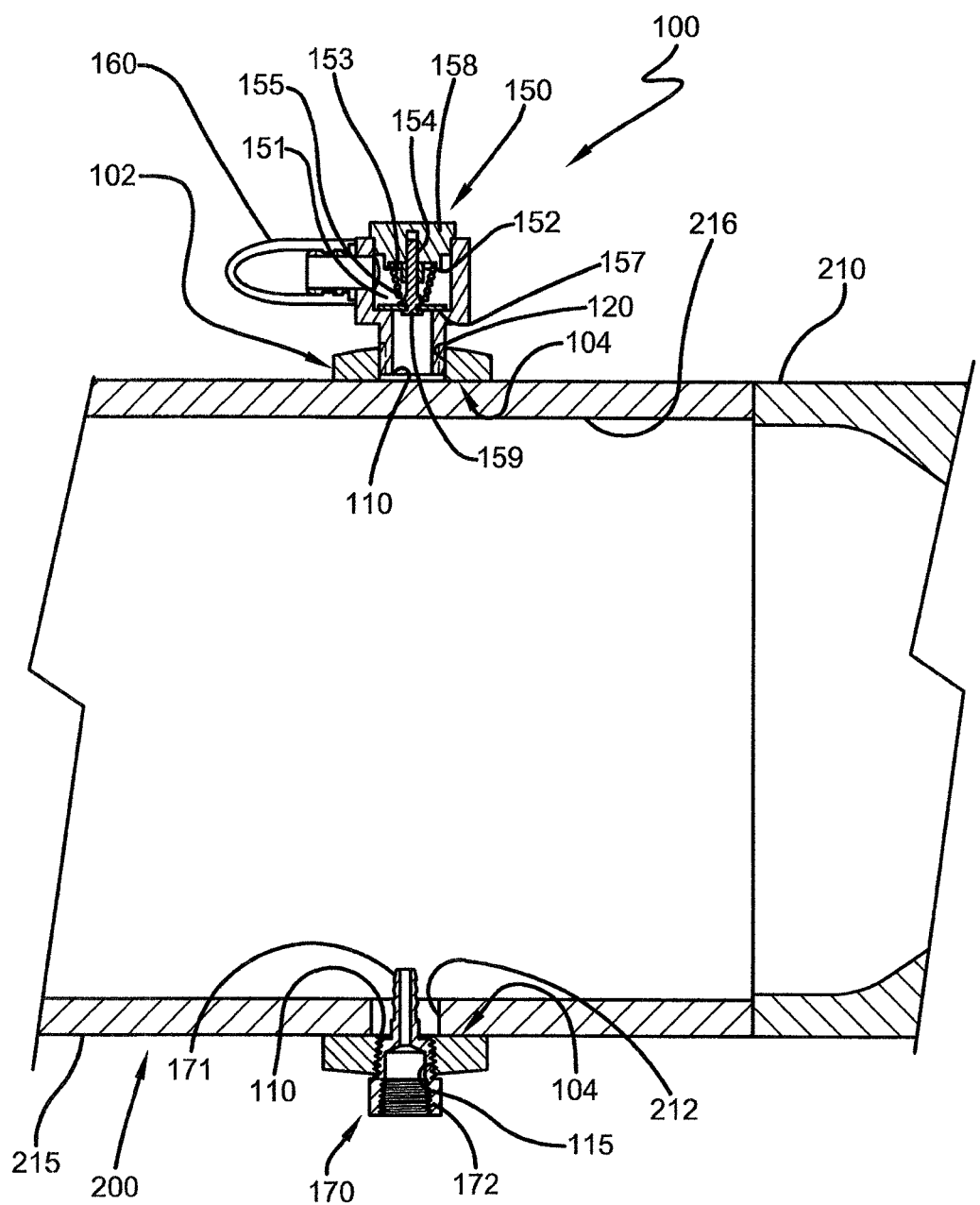
FIG. 7 is a fragmentary cross-sectional view of a portion of the axle and the first preferred embodiment brake hardware mounting component with integrated axle vent system and tire inflation system air supply line connector of FIG. 6, taken along line 7-7, and showing the orientation and mounting of components of the first preferred embodiment brake hardware mounting component with integrated axle vent system and tire inflation system air supply line connector relative to the axle.

Having described the environment in which it operates, the brake hardware mounting component with integrated axle vent system of the present invention will now be described. A first preferred embodiment brake hardware mounting component with an integrated axle vent system 100 and having an optional air supply line connector 170 of a tire inflation system, such as tire inflation system 40 (FIGS. 1-2), of the present invention is shown in FIGS. 5-7. First preferred embodiment brake hardware mounting component with integrated axle vent system 100 and air supply line connector 170 includes a body 102. Body 102 is formed as and doubles as a torque plate for mounting components of a disc brake system, the general structure and function of which is well known in the art. With specific reference to FIG. 5, body 102 is formed with a central opening 105 through which an axle 200 of a heavy-duty vehicle axle/suspension system (not shown) is disposed (FIGS. 6-7). Axle 200 is similar in structure and function to axle 10 described above, and includes a central tube 215 and an axle spindle 210 (FIGS. 6-7) connected to each end of the central tube by any suitable means, such as welding. Axle 200 includes a hollow interior chamber 216 (FIG. 7).

With reference to FIGS. 6 and 7, body 102 is circumferentially welded to central tube 215 of axle 200 at the inboard and outboard interface of the body to the axle central tube to form an air tight seal between the body and axle. Once welded on axle 200, body 102 is positioned outboard of a respective beam (not shown) of a heavy-duty vehicle axle/suspension system attached to the axle.

Body 102 enables components of a disc brake assembly 220 to be mounted to first preferred embodiment brake hardware mounting component with an integrated axle vent system 100 and an air supply line connector 170. With reference to FIGS. 5-6, body 102 is formed with a plurality of openings 103. With particular reference to FIG. 6, a carrier 230 of disc brake assembly 220 is mechanically fastened to body 102 via a plurality of bolts (not shown) disposed through one or more of plurality of openings 103 and respective openings (not shown) formed in the carrier. A caliper 240 of disc brake assembly 220 is attached to carrier 230 in a known manner, the structure and function of which is well known in the art.

Body 102 is also formed with a plurality of protrusions 106. A respective one of a plurality of openings 107 is formed in each of protrusions 106 to accommodate mounting of a rotor shield (not shown) via fasteners or any other suitable means. Body 102 is also formed with a pair of bosses 108. Each boss 108 is formed with a transversely extending opening 109. Openings 109 accommodate mounting of components of an Antilock Braking System (ABS), such as an ABS sensor (not shown), utilized in conjunction with disc brake assembly 220.

With reference to FIGS. 5 and 7, central opening 105 of body 102 is formed with an annular groove 110. More specifically, annular groove 110 is formed within the transverse center of a transversely extending surface 104 of central opening 105. Annular groove 110 extends circumferentially around central opening 105, such that the groove is positioned adjacent to central tube 215 of axle 200 when body 102 is circumferentially welded to the axle central tube. With particular reference to FIG. 7, a threaded first radial opening 115 is formed within body 102 and extends perpendicularly through annular groove 110. An opening 212 drilled in central tube 215 of axle 200 is aligned with and is in fluid communication with first radial opening 115 when body 102 is circumferentially welded to central tube 215.

Air supply line connector 170 of first preferred embodiment brake hardware mounting component with integrated axle vent system 100 is disposed through and threadably engages first radial opening 115 of body 102. A pneumatic conduit (not shown) of a tire inflation system incorporated into axle 200, such as pneumatic conduit 44 of tire inflation system 40 (FIGS. 1-2), threadably engages and is in fluid communication with a first end 171 of air supply line connector 170. Opening 212 of central tube 215 of axle 200 and first radial opening 115 are sized such that once the pneumatic conduit is connected to first end 171 of air supply line connector 170, air can flow from within axle 200, around the connector, and into annular groove 110. An air supply hose (not shown) is connected to a second end 172 of air supply line connector 170, and is in turn connected to an air supply tank (not shown) of the heavy-duty vehicle. Air is transferred from the air supply tank, through the air supply hose, air supply line connector 170, the pneumatic conduit, components of the tire inflation system within the wheel end assembly, and ultimately to the vehicle tires. It is to be understood that air supply line connector 170 could have a different structure than that shown and described without affecting the overall concept or operation of the present invention. It is also to be understood that opening 212 could be positioned at different locations on central tube 215 of axle 200 relative to body 102 and annular groove 110, and could interface first end 171 of air supply line connector 170 and the annular groove differently than that shown. For example, opening 212 could be positioned on central tube 215 adjacent to body 102 and interface annular groove 110 through a transversely extending opening (not shown) formed through the body such that the pneumatic conduit extends into the groove perpendicularly to the axle opening, and is connected to first end 171 of air supply line connector 170 therein. In addition, first radial opening 115 could be non-threaded, with air supply line connector 170 disposed within and attached to the first radial opening by any suitable means, such as welding, without affecting the overall concept or operation of the present invention.

With reference to FIG. 7, a second radial opening 120 is formed within body 102 and is in fluid communication with annular groove 110. Second radial opening 120 is opposed to first radial opening 115 about central opening 105 of the body. More specifically, second radial opening 120 extends through body 102 perpendicularly to annular groove 110 at a location about one hundred eighty degrees from first radial opening 115. It is to be understood that second radial opening 120 could be formed in body 102 at other radial locations relative to first radial opening 115 without affecting the overall concept and operation of the present invention.

A check valve 150 is disposed within and attached to second radial opening 120, and is in fluid communication with annular groove 110. Check valve 150 is of the type described in U.S. Pat. No. 8,925,574, assigned to Applicant of the present invention, Hendrickson USA, L.L.C., and allows the one-way flow of both low pressure air and high pressure air through the valve. With reference to FIG. 7, check valve 150 includes a valve chamber 151. A conical spring 152 integrated into or with a retention pin 154 is disposed within valve chamber 151. Spring 152 seats on its broad end 153 against an upper housing 158 of retention pin 154, and on its narrow end 155, against a base 159 of the retention pin. A diaphragm 157 is attached to retention pin 154. When low pressure air flows into valve chamber 151 from interior chamber 216 of axle 200, diaphragm 157 flexes about retention pin 154 to enable a low volume of air to flow through the valve chamber. When high pressure air flows into valve chamber 151 from interior chamber 216 of axle 200, the force of the high volume of air overcomes the bias of spring 152 and moves diaphragm 157 toward upper housing 158 to enable the high volume of air to flow through valve chamber 151. It is to be understood that the structure of check valve 150 could be different than that shown without affecting the overall concept or operation of the present invention. Although shown as a separate structure from second radial opening 120, check valve 150 could also be integrally formed within the second radial opening. Alternatively, second radial opening 120 can be threaded and check valve 150 secured within the second radial opening by threadably engaging the second radial opening.

An axle vent exhaust tube 160 is connected to and is in fluid communication with check valve 150. Axle vent exhaust tube is formed of a flexible material to enable the exhaust tube to be selectively positioned from check valve 150 to direct low pressure air or high pressure air from the check valve in a desired direction.

In accordance with an important aspect of first preferred embodiment brake hardware mounting component with integrated axle vent system 100 and optional air supply line connector 170 of the present invention, when either a low pressure air build-up, such as from an increase in ambient temperature, dynamic heating of the wheel end assembly, changes in atmospheric pressure, and/or a small leak in the tire inflation system, or alternatively a high pressure air build-up, such as from a tire inflation system supply line or rotary union leak, occurs within interior chamber 216 of axle 200, the first preferred embodiment brake hardware mounting component with integrated axle vent system and optional tire inflation system air supply line connector provides a means to eliminate the pressure build-up within the axle. More specifically, as a low or high air pressure build-up is experienced within the interior chamber 216 of axle 200, because opening 212 of central tube 215 of axle 200 and first radial opening 115 are sized such that air can flow from the interior chamber of the axle, around the pneumatic conduit of a tire inflation system, and into annular groove 110, high pressure and low pressure air from within the interior chamber of the axle is forced through the groove in both annular directions to check valve 150, and is vented through axle vent exhaust tube 160 to atmosphere. It is understood that annular groove 110 is sized relative to axle opening 212 to facilitate sufficient flow of air build-up through check valve 150 when necessary.

Figure 3A:
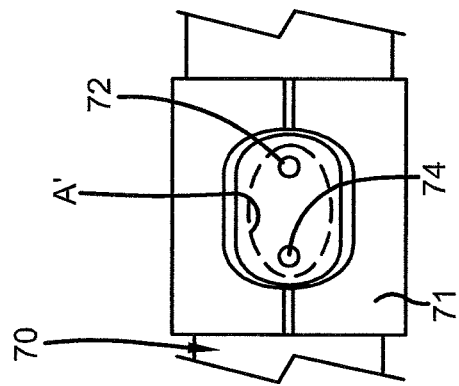
FIG. 3A is an enlarged view of a portion of an axle with an axle wrap of the type shown in FIG. 3, with the area in which openings are drilled/tapped in the wrap window to accommodate components of a prior art tire inflation system and axle vent device shown in dashed lines.
Figure 3:
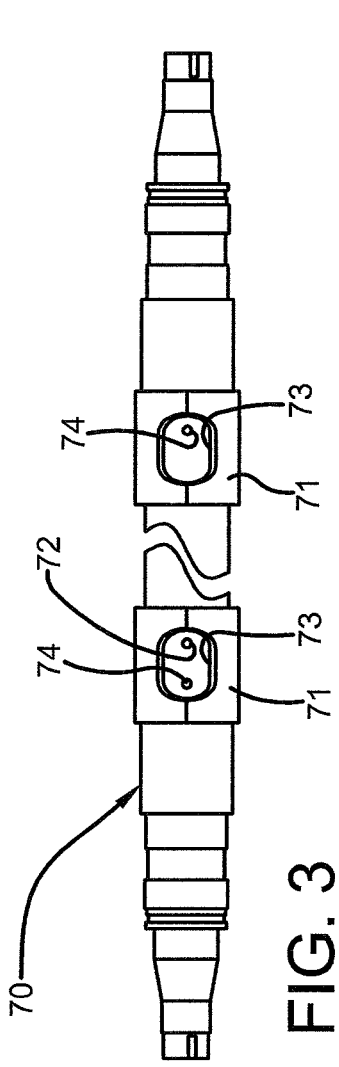
FIG. 3 is a fragmentary elevational view of an axle that utilizes axle wraps to attach the beams of a heavy-duty vehicle axle/suspension system to the axle, showing the positioning of the openings drilled/tapped into the axle within windows formed in the axle wraps to accommodate mounting of components of a prior art tire inflation system and axle vent device.
Figure 4:
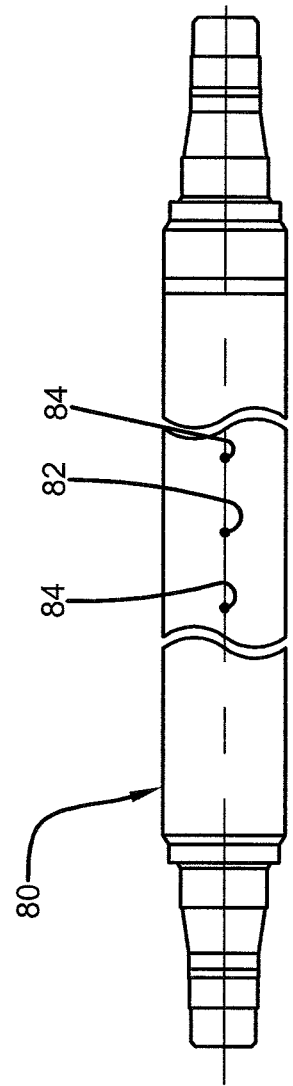
FIG. 4 is a fragmentary top plan view of a floating axle, showing the positioning of the openings drilled/tapped into the axle to accommodate components of a prior art tire inflation system and axle vent device.

In accordance with another important aspect of the present invention, first preferred embodiment brake hardware mounting component with integrated axle vent system 100 and air supply line connector 170 eliminates the need to drill/tap a separate opening in axle 200 for check valve 150 to provide venting of high and low pressure build-ups from within interior chamber 216 of the axle. With reference to FIGS. 3 and 3A, in heavy-duty vehicle axle/suspension systems (not shown) which utilize a pair of axle wraps 71 to attach an axle 70 to the beams (not shown) of the axle/suspension system, prior art axle vent devices typically require an opening 72 to be drilled/tapped into the axle within a limited area of a window 73 formed in the wraps to accommodate attachment of a check valve (not shown) of an axle vent device, designated as an area A' shown within dashed lines in FIG. 3A. Opening 72 is in addition to a pair of openings 74 through which tire inflation system air supply lines (not shown) are required to be connected. With reference to FIG. 4, in an axle/suspension system (not shown) which does not utilize an axle wrap system to attach an axle 80 to the axle/suspension system beams, prior art axle vent devices also typically require an additional opening 82, separate from a pair of openings 84 through which tire inflation system air supply lines (not shown) are connected, to be drilled/tapped on the top and near the center of the axle between the pair of air supply line openings to accommodate attachment of a check valve (not shown) of an axle vent device. Drilling/tapping of openings 72, 82 in addition to pairs of openings 74, 84 to accommodate attachment of the axle vent device check valve increases the machining operations and time required to prepare axles 70, 80 and install the axle vent device on the axles. Because check valve 150 is attached to body 102 within second radial opening 120 of first preferred embodiment brake hardware mounting component with integrated axle vent system 100 and air supply line connector 170, the necessity to drill/tap an additional opening within axle 200 to accommodate the check valve, as required by prior art axle vent devices, is effectively eliminated, thereby reducing the manufacturing steps required to prepare axle 200 for attachment of an axle vent system and increasing manufacturing efficiency, as well as reducing manufacturing costs.

In addition, first preferred embodiment brake hardware mounting component with integrated axle vent system 100 and air supply line connector 170 minimizes the materials required to incorporate a tire inflation system (not shown), such as tire inflation system 40, into a heavy-duty vehicle axle/suspension system (not shown) as compared to the prior art. More specifically, because tire inflation system air supply line connector 170 is integrated into body 102, and the body is attached to axle 200 outboardly of the openings through which tire inflation system air supply lines (not shown) are required to be connected in prior art tire inflation systems, such as openings 74 and 84 formed in axles 70 and 80 (FIGS. 3 and 4), respectively, the length of the pneumatic conduit required between a tire inflation system rotary union (not shown) and the air supply line connector is much shorter than that required in the prior art tire inflation systems. Thus, first preferred embodiment brake hardware mounting component with integrated axle vent system 100 and air supply line connector 170 of the present invention reduces the length of air supply lines, such as pneumatic conduit 44, required to incorporate the tire inflation system into the heavy-duty vehicle axle/suspension system (not shown) compared to prior art tire inflation systems, thereby reducing manufacturing costs.

In accordance with yet another important aspect of the present invention, first preferred embodiment brake hardware mounting component with integrated axle vent system 100 and air supply line connector 170 provides stronger attachment of components of the axle vent system compared to attachment of the prior art axle vent devices directly to the axle in heavy-duty vehicle axle/suspension systems utilizing thin walled axles. As previously discussed, prior art axle vent devices typically include check valves that threadably engage separate openings drilled/tapped into an axle of the respective heavy-duty vehicle axle/suspension system to attach the axle vent devices to their respective axle. In an axle/suspension system which utilizes a thin walled axle, there is generally less threading for the check valve to engage, which can possibly result in a less secure attachment of the axle vent device to the thin walled axle as compared to attachment of the axle vent device to an axle of a heavy-duty vehicle axle/suspension system that utilizes a thicker wall. Because body 102 is generally thicker than a thin walled axle, and check valve 150 is connected to or threadably engages second radial opening 120 within the body, greater securement or thread engagement of check valve 150 to the body is provided compared to attachment of a prior art axle vent device check valve to a thin walled axle.

In accordance with yet another important aspect of the present invention, first preferred embodiment brake hardware mounting component with integrated axle vent system 100 and air supply line connector 170 provides increased protection to axle vent system components, such as check valve 150 and axle vent exhaust tube 160, compared to prior art axle vent devices which are attached to heavy-duty vehicle axle/suspension systems with axles that do not utilize axle wraps with windows to attach the axle/suspension system beams to the axle, such as axles which utilize a crimp system to attach the beams to the axle, or floating axles. Because brake components, such as components of disc brake assembly 220, are attached to body 102, and check valve 150 is positioned slightly inboard of the brake components, the brake components effectively shield the check valve from road debris and contaminants, thereby reducing potential for damage to the components during vehicle operation and reducing vehicle maintenance costs.

In accordance with still another important aspect of the present invention, first preferred embodiment brake hardware mounting component with integrated axle vent system 100 and air supply line connector 170 provides greater flexibility to orient check valve 150 and axle vent exhaust tube 160 as compared to the prior art. Because check valve 150 is attached to body 102 and not directly to axle 200, as with the prior art, the limitations of mounting the check valve at an area of low stress on the axle, such as the top-center of the axle in the case of floating axles, or within the window of an axle wrap in heavy-duty vehicle axle/suspension systems which utilize a wrap system, is eliminated. As such, second radial opening 120 could be formed in torque plate body 102 at other annular locations relative to first radial opening 115. Thus, second radial opening 120 can be formed in torque plate body 102 at other locations relative to first radial opening 115 in order to accommodate various heavy-duty axle/suspension system configurations, including other brake hardware designs. It is to be understood that first preferred embodiment brake hardware mounting component with integrated axle vent system 100 can be utilized without a tire inflation system and air supply line connector 170 without affecting the overall concept or operation of the present invention.

A second preferred embodiment brake hardware mounting component with an integrated axle vent system 300 and having an optional an air supply line connector 370 of a tire inflation system of the present invention is shown in FIGS. 8-12. Second preferred embodiment brake hardware mounting component with integrated axle vent system 300 and air supply line connector 370 is similar in structure and function to first preferred embodiment brake hardware mounting component with integrated axle vent system 100 and air supply line connector 170, except that it includes a check valve 350 positioned on the brake hardware mounting component at a different location than the first embodiment, as will be described in detail below.

Second preferred embodiment brake hardware mounting component with integrated axle vent system 300 and air supply line connector 370 includes a body 302. Body 302 is formed as and doubles as a torque plate for mounting components of a disc brake system, the general structure and function of which is well known in the art. With specific reference to FIG. 8, body 302 is formed with a central opening 305 through which axle 200 is disposed (FIGS. 11-12). With reference to FIGS. 11-12, body 302 is circumferentially welded to central tube 215 of axle 200 at the inboard and outboard interface of the body to the axle central tube to form an air tight seal between the body and axle. Once welded on axle 200, body 302 is positioned outboard of a respective beam (not shown) of a heavy-duty vehicle axle/suspension system attached to the axle.

Figure 8:
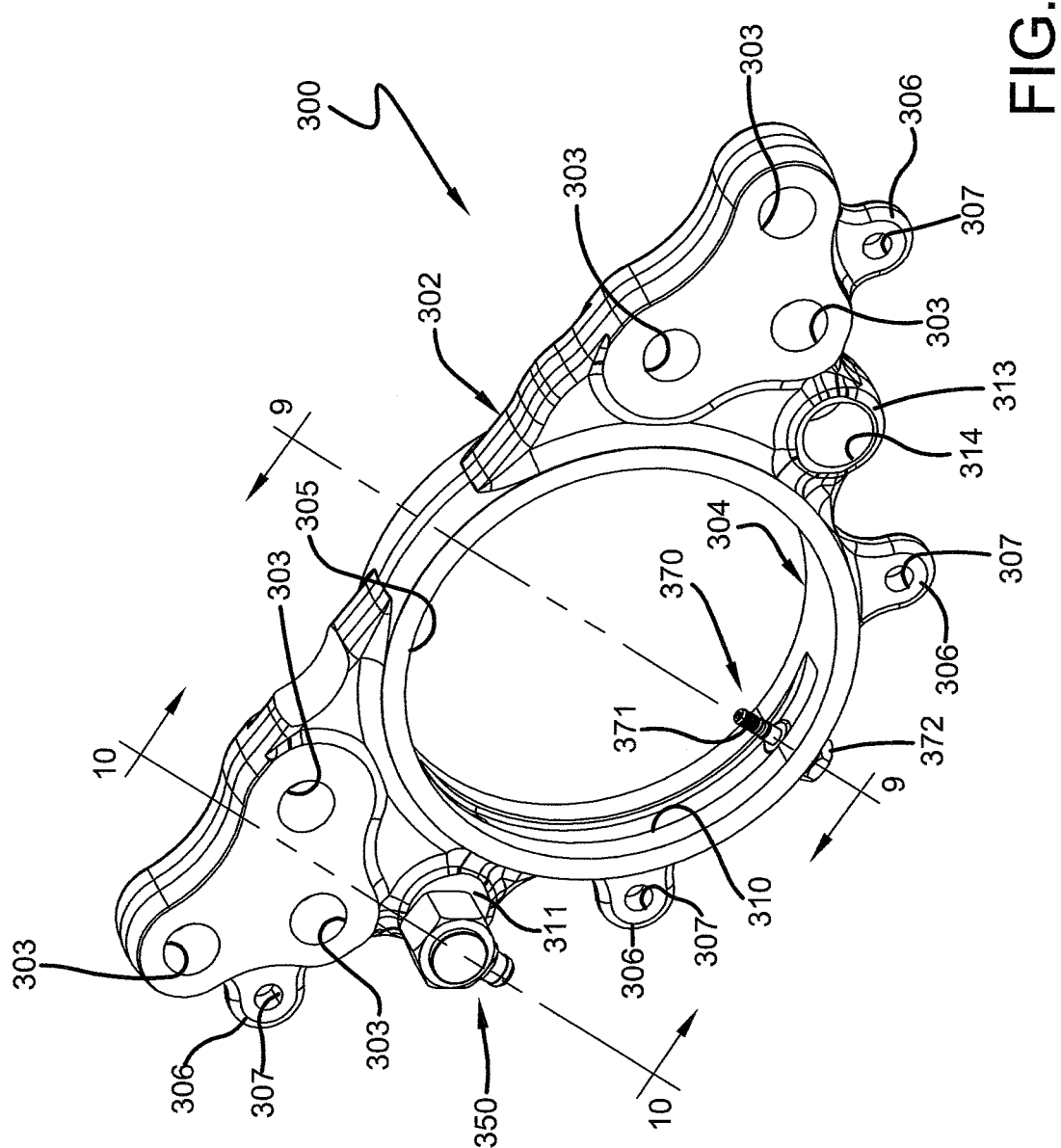
FIG. 8 is a perspective view, looking in the outboard direction, of a second preferred embodiment brake hardware mounting component with integrated axle vent system and having an optional tire inflation system air supply line connector of the present invention.

Body 302 enables components of disc brake assembly 220 to be mounted to second preferred embodiment brake hardware mounting component with integrated axle vent system 300 and air supply line connector 370. With reference to FIGS. 8 and 11, body 302 is formed with a plurality of openings 303. With particular reference to FIG. 11, carrier 230 of disc brake assembly 220 is mechanically fastened to body 302 via a plurality of bolts (not shown) disposed through one or more of plurality of openings 303 and respective openings formed in the carrier. Caliper 240 of disc brake assembly 220 is mounted to carrier 230 in a known manner, the structure and function of which is well known in the art.

Body 302 is also formed with a plurality of protrusions 306. A respective one of a plurality of openings 307 is formed in each of protrusions 306 to accommodate mounting of a rotor shield (not shown) via fasteners (not shown) or any other suitable means. Body 302 is also formed with a first boss 311 and a second boss 313. First boss 311 is formed with a transversely extending non-continuous opening 312, the importance of which will be described below. Second boss 313 is formed with a transversely extending opening 314, which accommodates mounting of a component of an ABS, such as an ABS sensor (not shown), utilized in conjunction with disc brake assembly 220.

Figure 9:
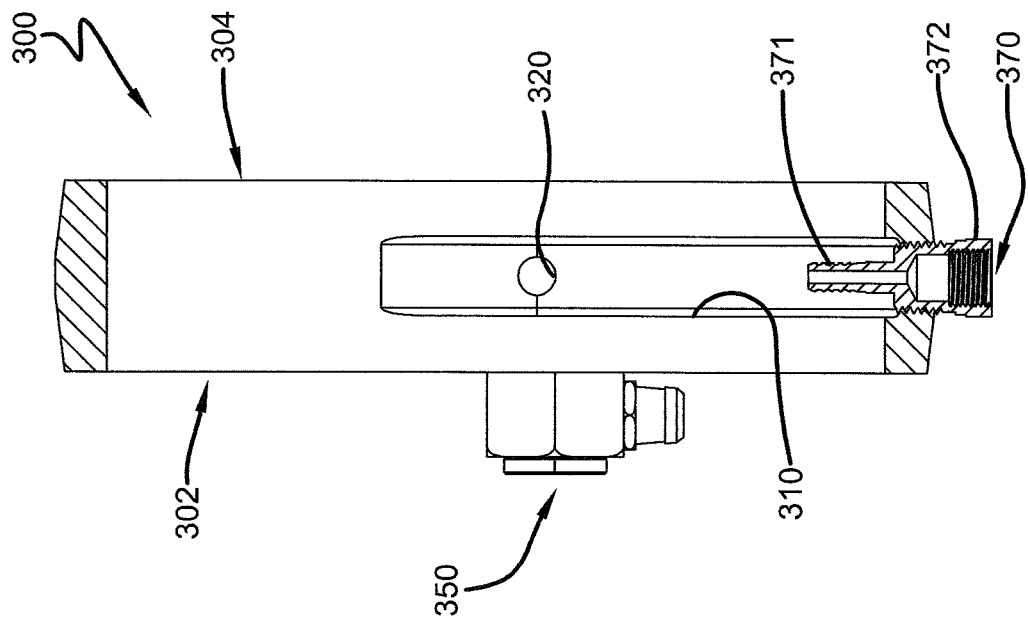
FIG. 9 is a cross-sectional view of the second preferred embodiment brake hardware mounting component with integrated axle vent system and tire inflation system air supply line connector of FIG. 8, taken along line 9-9.

With reference to FIGS. 8 and 9, central opening 305 of body 302 is formed with a partially annular groove 310. More specifically, partially annular groove 310 is formed within the transverse center of a transversely extending surface 304 of central opening 305. Partially annular groove 310 extends partially circumferentially around central opening 305, such that the groove is positioned adjacent to central tube 215 of axle 200 when body 302 is circumferentially welded to the axle central tube. With particular reference to FIGS. 9 and 12, a threaded first radial opening 315 is formed within body 302 and extends perpendicularly through partially annular groove 310. Opening 212 of axle central tube 215 is aligned with and is in fluid communication with first radial opening 315 when body 302 is circumferentially welded to axle central tube 215.

Air supply line connector 370 of second preferred embodiment brake hardware mounting component with integrated axle vent system 300 is disposed through and threadably engages first radial opening 315 of body 302. A pneumatic conduit (not shown) of a tire inflation system incorporated into axle 200, such as pneumatic conduit 44 of tire inflation system 40 (FIGS. 1-2) threadably engages and is in fluid communication with a first end 371 of air supply line connector 370. Opening 212 of axle central tube 215 and first radial opening 315 are sized such that once the pneumatic conduit is connected to first end 371 of air supply line connector 370, air can flow from within interior chamber 216 of axle 200, around the connector, and into partially annular groove 310. An air supply hose (not shown) is connected to a second end 372 of air supply line connector 370, and is in turn connected to an air supply tank (not shown) of the heavy-duty vehicle. Air is transferred from the air supply tank, through the air supply hose, air supply line connector 370, the pneumatic conduit, components of the tire inflation system within the wheel end assembly, and ultimately to the vehicle tires. It is to be understood that air supply line connector 370 could have a structure different than that shown and described without affecting the overall concept or operation of the present invention. It is to be understood that opening 212 could be positioned at different locations on axle central tube 215 relative to body 302 and partially annular groove 310, and could interface first end 371 of air supply line connector 370 and the annular groove differently than that shown. For example, opening 212 could be positioned on axle central tube 215 adjacent to body 302 and interface partially annular groove 310 through a transversely extending opening (not shown) formed through the body such that the pneumatic conduit extends into the groove perpendicularly to the axle opening, and is connected to first end 371 of air supply line connector 370 therein. In addition, first radial opening 315 could be non-threaded, with air supply connector 370 disposed within and attached to the first radial opening by any suitable means, such as welding, without affecting the overall concept or operation of the present invention.

Figure 10:
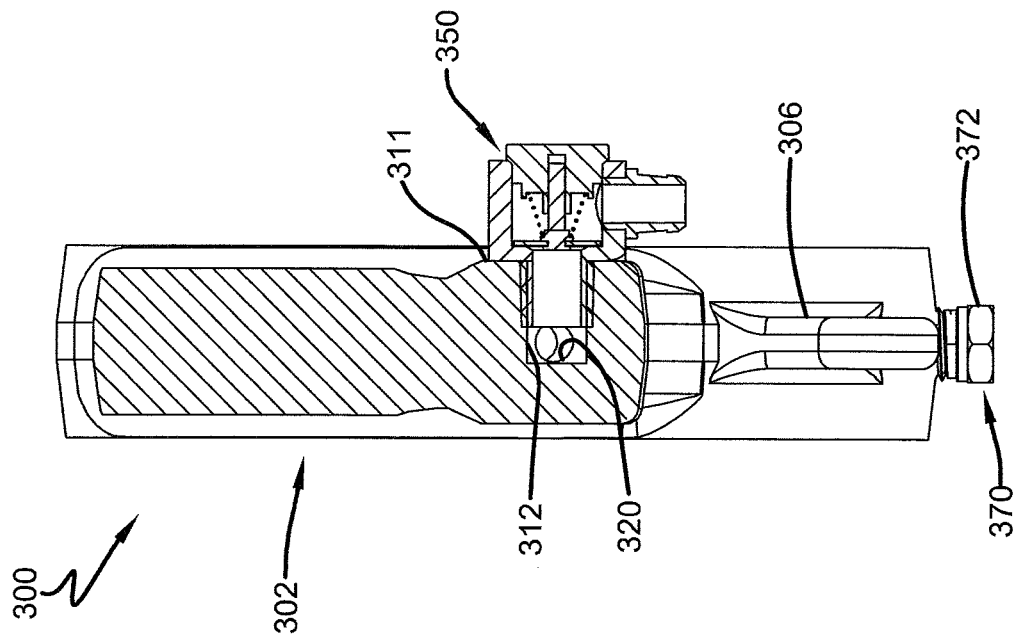
FIG. 10 is a cross-sectional view of the second preferred embodiment brake hardware mounting component with integrated axle vent system and tire inflation system air supply line connector of FIG. 8, taken along line 10-10.

With reference to FIG. 9, a second radial opening 320 is formed within body 302 perpendicular to first radial opening 315. More specifically, second radial opening 320 extends partially through body 202 perpendicularly to partially annular groove 310 at a location about ninety degrees from first radial opening 315. It is to be understood that second radial opening 320 could be formed in body 302 at other radial locations relative to first radial opening 315 without affecting the overall concept and operation of the present invention. With reference to FIG. 10, second radial opening 320 intersects and is in fluid communication with non-continuous opening 312 of first boss 311.

A check valve 350 is disposed within and attached to non-continuous opening 312 of first boss 311 by any suitable means. Check valve 350 is similar in structure and function to check valve 150, and allows the one-way flow of both low pressure air and high pressure air through the check valve. It is to be understood that the structure of check valve 350 could be different than that shown without affecting the overall concept or operation of the present invention. Check valve 350 is connected to and in fluid communication with an axle vent exhaust tube 360 to allow the passage of both low pressure and high pressure air flow from partially annular groove 310, through the check valve, through axle vent exhaust tube 360, and to atmosphere. Axle vent exhaust tube 360 is formed of a flexible material to enable the exhaust tube to be selectively positioned from check valve 350 to direct low pressure air or high pressure air from the check valve in a desired direction. Although shown as a separate structure from non-continuous opening 312, check valve 350 can be integrally formed within the non-continuous opening. Alternatively, non-continuous opening 312 can be threaded and check valve 350 secured within the second radial opening by threadably engaging the non-continuous opening.

In this manner, when either a low pressure air build-up, such as from an increase in ambient temperature, dynamic heating of the wheel end assembly, changes in atmospheric pressure, and/or a small leak in the tire inflation system, or alternatively a high pressure air build-up, such as from a tire inflation system supply line or rotary union leak, occurs within interior chamber 216 of axle 200, second preferred embodiment brake hardware mounting component with integrated axle vent system 300 and air supply line connector 370 provides a means to eliminate the pressure build-up within the axle. More specifically, as a low or high air pressure build-up is experienced within interior chamber 216 of axle 200, because opening 212 of axle central tube 215 and first radial opening 315 are sized such that air can flow from the interior chamber of the axle, around the pneumatic conduit of a tire inflation system, and into partially annular groove 310, high pressure or low pressure air from within the interior chamber of the axle is directed annularly through the groove, through second radial opening 320, non-continuous opening 312 of first boss 311, check valve 350, and is ultimately vented through axle vent exhaust tube 360 to atmosphere. It is understood that partially annular groove 310 is sized relative to axle opening 212 to facilitate sufficient flow of low pressure and high pressure air build-ups through check valve 350 when necessary.

Second preferred embodiment brake component mounting structure with integrated axle vent system 300 and air supply line connector 370 provides similar benefits as described with reference to first preferred embodiment brake component mounting structure with integrated axle vent system 100 and air supply line connector 170. In addition, second preferred embodiment brake component mounting structure with integrated axle vent system 300 and air supply line connector 370 further reduces manufacturing complexity and minimizes manufacturing cost as compared to first preferred embodiment brake component mounting structure with integrated axle vent system 100 and air supply line connector 170. More specifically, because check valve 350 is disposed within and attached to non-continuous opening 312 of first boss 311, and second radial opening 320 intersects the non-continuous opening and is formed within partially annular groove 310 about ninety degrees from first radial opening 315, the circumference of the annular groove required to provide a path for low pressure or high pressure air from the first radial opening to the second radial opening is minimized, and thus reduces the machining required to form the groove, thereby reducing manufacturing complexity and minimizing manufacturing costs. It is to be understood that second preferred embodiment brake hardware mounting component with integrated axle vent system 300 can be utilized without a tire inflation system and air supply line connector 370 without affecting the overall concept or operation of the present invention.

A third preferred embodiment brake hardware mounting component with an integrated axle vent system 400 and having an optional air supply line connector 470 of a tire inflation system, such as tire inflation system 40 (FIGS. 1-2), of the present invention is shown in FIGS. 13-17. Third preferred embodiment brake hardware mounting component with integrated axle vent system 400 and an air supply line connector 470 is similar in function to first preferred embodiment brake hardware mounting component with integrated axle vent system 100 and air supply line connector 170, but includes a structure that enables mounting of components of a drum brake system for heavy-duty vehicles, as will be described in detail below.

Third preferred embodiment brake hardware mounting component with integrated axle vent system 400 and air supply line connector 470 includes a body 402. Body 402 is formed as and doubles as a brake spider for mounting components of a drum brake assembly 520 (FIG. 16), the general structure and function of which is well known in the art. With specific reference to FIG. 13, body 402 is formed with a central opening 405 through which axle 200 is disposed (FIGS. 16-17). With reference to FIGS. 16 and 17, body 402 is circumferentially welded to central tube 215 of axle 200 at the inboard and outboard interface of the body to the axle central tube to form an air tight seal between the body and axle. Once welded on axle 200, body 402 is positioned outboard of a respective beam (not shown) of a heavy-duty vehicle axle/suspension system attached to the axle.

Body 402 enables components of a drum brake assembly 520 to be mounted to third preferred embodiment brake hardware mounting component with integrated axle vent system 400 and air supply line connector 470. With reference to FIG. 13, body 402 is formed with a pair of transversely extending anchor pin openings 406, in which a respective one of a pair of anchor pins (not shown) and a respective anchor pin bushing (not shown) of drum brake assembly 520 are disposed. An upper brake shoe 526 and a lower brake shoe 527 are rotatably fixed to body 402 via a respective one of the pair of anchor pins in a known manner. A pair of brake pads 530 are attached to each of upper brake shoe 526 and lower brake shoe 527 in a known manner. Body 402 is also formed with a cam shaft opening 408, through which a cam shaft assembly 528 with an attached S-cam 529 of drum brake assembly 520 is disposed and rotatably mounted in a known manner. Drum brake assembly 520 provides braking to the vehicle in a known manner. Body 402 is also formed with a transversely extending opening 412, which accommodates mounting of a component of an ABS, such as an ABS sensor (not shown), utilized in conjunction with drum brake assembly 520.

With reference to FIGS. 13-15 and 17, central opening 405 of body 402 is formed with an annular groove 410. More specifically, annular groove 410 is formed within the transverse center of a transversely extending surface 404 of central opening 405. Annular groove 410 extends circumferentially around central opening, such that the groove is positioned adjacent to axle central tube 215 when body 402 is circumferentially welded to the axle central tube (FIGS. 16-17). With reference to FIGS. 14 and 17, a threaded first radial opening 415 is formed within body 402 and extends perpendicularly through annular groove 410. Opening 212 of central tube 215 of axle 200 is aligned with and is in fluid communication with first radial opening 415 when body 402 is circumferentially welded to the axle central tube.

Air supply line connector 470 of third preferred embodiment brake hardware mounting component with integrated axle vent system 400 is disposed through and threadably engages first radial opening 415 of body 402. A pneumatic conduit (not shown) of a tire inflation system incorporated into axle 200, such as pneumatic conduit 44 of tire inflation system 40 (FIGS. 1-2), threadably engages and is in fluid communication with a first end 471 of air supply line connector 470. Opening 212 of central tube 215 of axle 200 and first radial opening 415 are sized such that once the pneumatic conduit is connected to first end 471 of air supply line connector 470, air can flow from within interior chamber 216 of axle 200, around the connector and into annular groove 410. An air supply hose (not shown) is connected to a second end 472 of air supply line connector 470, and is in turn connected to an air supply tank (not shown) of the heavy-duty vehicle. Air is transferred from the air supply tank, through the air supply hose, air supply line connector 470, the pneumatic conduit, components of the tire inflation system within the wheel end assembly, and ultimately to the vehicle tires. It is to be understood that air supply line connector 470 could have a structure different than that shown and described without affecting the overall concept or operation of the present invention. It is also to be understood that opening 212 could be positioned at different locations on axle central tube 215 relative to body 402 and annular groove 410, and could interface first end 471 of air supply connector 470 and the annular groove differently than that shown. For example, opening 212 could be positioned on axle central tube 215 adjacent to body 402 and interface annular groove 410 through a transversely extending opening (not shown) formed through the body such that the pneumatic conduit extends into the groove perpendicularly to the axle opening, and is connected to first end 471 of air supply line connector 470 therein. In addition, first radial opening 415 could be non-threaded, with air supply line connector 470 disposed within and attached to the first radial opening by any suitable means, such as welding, without affecting the overall concept or operation of the present invention.

With reference to FIG. 15, a second radial opening 420 is formed within body 402 adjacent to first radial opening 415 about central opening 405 of the body. Second radial opening 420 extends through body 402 perpendicularly to and is in fluid communication with annular groove 410.

A check valve 450 is disposed within and attached to second radial opening 420 by any suitable means. Check valve 450 is similar in structure and function to check valve 150, and allows the flow of both low pressure air and high pressure air through the check valve. It is to be understood that the structure of check valve 450 could be different than that shown without affecting the overall concept or operation of the present invention. Check valve 450 is connected to and in fluid communication with an axle vent exhaust tube (not shown) similar to axle vent exhaust tubes 160 and 360 described above to allow the passage of both low pressure and high pressure air flow from annular groove 410, through the check valve, through the axle vent exhaust tube, and to atmosphere. Although shown as a separate structure from second radial opening 420, check valve 450 can be integrally formed within the second radial opening. Alternatively, second radial opening 420 can be threaded and check valve 450 secured within the second radial opening by threadably engaging the second radial opening.

In this manner, when either a low pressure air build-up, such as from an increase in ambient temperature, dynamic heating of the wheel end assembly, changes in atmospheric pressure, and/or a small leak in the tire inflation system, or alternatively a high pressure air build-up, such as from a tire inflation system supply line or rotary union leak, occurs within interior chamber 216 of axle 200, third preferred embodiment brake hardware mounting component with integrated axle vent system 400 and tire inflation system air supply line connector 470 provides a means to eliminate the pressure build-up within the axle. More specifically, as a low or high air pressure build-up is experienced within interior chamber 216 of axle 200, because opening 212 of axle central tube 215 and first radial opening 415 are sized such that air can flow from the interior chamber of the axle, around the pneumatic conduit of a tire inflation system, and into annular groove 410, high pressure or low pressure air from within the interior chamber of the axle is directed annularly through the groove, through second radial opening 420, check valve 450, and is ultimately vented through the axle vent exhaust tube to atmosphere. It is understood that annular groove 410 is sized relative to axle opening 212 to facilitate sufficient flow of low pressure and high pressure air build-ups through check valve 450 when necessary.

Third preferred embodiment brake component mounting structure with integrated axle vent system 400 and tire inflation system air supply line connector 470 provides similar benefits as described with reference to first preferred embodiment brake component mounting structure with integrated axle vent system 100 and air supply line connector 170. It is to be understood that third preferred embodiment brake hardware mounting component with integrated axle vent system 400 can be utilized without a tire inflation system and air supply line connector 470 without affecting the overall concept or operation of the present invention.

It is to be understood that the structure and arrangements of the above-described brake component mounting structure with integrated axle vent system of the present invention may be altered or rearranged without affecting the overall concept or operation of the invention. In addition, the brake component mounting structure with integrated axle vent system of the present invention may be employed with other types of axles, wheel end assemblies, and axle/suspension systems than those shown and described above, such as trailing and leading arm axle/suspension systems, and liftable and non-liftable axle/suspension systems, without affecting the overall concept or operation of the invention. It is to be understood that the brake component mounting structure with integrated axle vent system of the present invention could be used with other disc brake systems or drum brake systems than those shown or described without affecting the overall concept or operation of the invention. It is contemplated that concepts of the present invention could be integrated into other brake hardware mounting components or other components of an axle/suspension system than those shown or described without affecting the overall concept or operation of the invention. Moreover, while reference herein has been made generally to heavy-duty vehicles for the purposes of convenience, it has been with the understanding that such reference includes trucks, tractor-trailers and semi-trailers, and trailers thereof. It is to be understood that the brake hardware mounting component with integrated axle vent system of the present invention can be utilized without a tire inflation system and air supply line connector without affecting the overall concept or operation of the present invention.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the present invention has been described with reference to a specific embodiments. It shall be understood that these illustrations are by way of example and not by way of limitation, as the scope of the invention is not limited to the exact details shown or described. Potential modifications and alterations will occur to others upon a reading and understanding of this disclosure, and it is understood that the invention includes all such modifications and alterations and equivalents thereof.

Having now described the features, discoveries and principles of the invention, the manner in which the brake component mounting structure with integrated axle vent system of the present invention is used and installed, the characteristics of the construction, arrangement and method steps, and the advantageous, new and useful results obtained; the new and useful structures, devices, elements, arrangements, processes, parts and combinations are set forth in the appended claims.

What is claimed is:

1. A brake component mounting structure for a heavy-duty vehicle comprising:
    a body, said body of said brake component mounting structure including a central opening through which an axle of an axle/suspension system is disposed, the body being rigidly attached to said axle, said body mounting one or more brake components of a brake system; and
    an axle vent system integrated into the body, said axle vent system being in fluid communication with an interior chamber of the axle and enabling pressurized air from said interior chamber to be vented to atmosphere.

2. The brake component mounting structure for a heavy-duty vehicle of claim 1, wherein said axle vent system includes a groove, said groove being formed in a transversely extending surface of said body central opening and extending partially annularly around said transversely extending surface, the groove being adjacent said axle.

3. The brake component mounting structure for a heavy-duty vehicle of claim 2, wherein said groove extends annularly around said transversely extending surface.

4. The brake component mounting structure for a heavy-duty vehicle of claim 2, further comprising a first radial opening formed in said body, said first radial opening providing fluid communication between said groove and an opening formed in said axle.

5. The brake component mounting structure for a heavy-duty vehicle of claim 4, further comprising an air supply line connector disposed within and attached to said first radial opening, said air supply line connector enabling closed fluid communication between an air source external of said axle and a component of a tire inflation system of the heavy-duty vehicle within said axle, said axle opening being sized to allow pressurized air from said axle interior chamber to flow around the air supply line connector and into said groove.

6. The brake component mounting structure for a heavy-duty vehicle of claim 4, further comprising a second radial opening formed in said body, said second radial opening being in fluid communication with said groove and atmosphere.

7. The brake component mounting structure for a heavy-duty vehicle of claim 6, wherein said second radial opening is formed in said body at a location about one hundred eighty degrees from said first radial opening relative to said body central opening.

8. The brake component mounting structure for a heavy-duty vehicle of claim 6, further comprising a check valve disposed within and attached to said second radial opening, said check valve enabling selective flow of pressurized air from said second radial opening to atmosphere.

9. The brake component mounting structure for a heavy-duty vehicle of claim 8, further comprising an exhaust tube connected to said check valve, said exhaust tube capable of being selectively positioned from the check valve.

10. The brake component mounting structure for a heavy-duty vehicle of claim 1, wherein said one or more brake components are for a disc brake system.

11. The brake component mounting structure for a heavy-duty vehicle of claim 1, wherein said one or more brake components are for a drum brake system.

12. The brake component mounting structure for a heavy-duty vehicle of claim 5, wherein said first radial opening is threaded, said air supply line connector threadably engaging the first radial opening to attach the air supply line connector to said first radial opening.

13. The brake component mounting structure or heavy-duty vehicles of claim 7, wherein said second radial opening is threaded, said check valve threadably engaging the second radial opening to attach the check valve to said second radial opening.

14. The brake component mounting structure for a heavy-duty vehicle of claim 6, wherein said second radial opening is formed in said groove at a position about one hundred eighty degrees from said first radial opening about said body central opening.

15. The brake component mounting structure for a heavy-duty vehicle of claim 6, wherein said second radial opening is formed in said groove at a position adjacent to said first radial opening about said body central opening.

16. The brake component mounting structure for a heavy-duty vehicle of claim 1, wherein said axle has a thickness of less than about 0.5 inches.

17. The brake component mounting structure for a heavy-duty vehicle of claim 8, wherein said check valve is a spring-biased diaphragm valve.

18. The brake components mounting structure for a heavy-duty vehicle of claim 4, wherein said body is formed with a boss, said boss including a non-continuous transversely extending opening which intersects said second radial opening, said brake component mounting structure further comprising a check valve disposed within and attached to said transversely extending opening, said check valve enabling selective flow of pressurize air from said second radial opening to atmosphere.

19. The brake component mounting structure for a heavy-duty vehicle of claim 17, wherein said second radial opening is formed is said body at a location about ninety degrees from said first radial opening.

20. A brake component mounting structure for a heavy-duty vehicle comprising:
- a body, said body including a central opening through which an axle of an axle/suspension system is disposed, the body being rigidly attached to said axle, said body providing a structure to mount components of a brake system;
- an axle vent system integrated into the body, said axle vent system including a groove formed in a transversely extending surface of said central opening and extending partially annularly around said transversely extending surface, said groove being adjacent the axle, the axle vent system being in fluid communication with an interior chamber of said axle and enabling pressurized air from said interior chamber to be vented to atmosphere; and
- a first radial opening formed in said body, said first radial opening providing fluid communication between the groove and an opening formed in said axle.

21. A brake component mounting structure for a heavy-duty vehicle comprising:
- a body, said body including a central opening through which an axle of an axle/suspension system is disposed, the body being rigidly attached to said axle;
- an axle vent system integrated into said body, said axle vent system being in fluid communication with an interior chamber of the axle by a single opening formed in said axle and enabling pressurized air from said interior chamber to be vented to atmosphere by said single opening; and
- an air supply line connector of a tire inflation system attached to the body adjacent to the single opening, said air supply line connector providing closed fluid communication between an air source external of the axle and a component of said tire inflation system within said axle, said single opening being sized to allow pressurized air from the interior chamber of the axle to flow around the air supply line connector and vent to atmosphere via the axle vent system.

* * * * *

UNITED STATES PATENT AND TRADEMARK OFFICE
CERTIFICATE OF CORRECTION

Page 1 of 1

PATENT NO. : 10,436,266 B2
APPLICATION NO. : 15/873948
DATED : October 8, 2019
INVENTOR(S) : Donald R. Hester and Benedetto A. Naples It is certified that error appears in the above-identified patent and that said Letters Patent is hereby corrected as shown below:

In the Claims

Amend Claim 13, Column 21, Lines 26-27, after the word "structure" delete "or heavy-duty vehicles" and insert --for a heavy-duty vehicle--.

Amend Claim 18, Column 22, Line 4, after the word "of" delete "pressurize" and insert --pressurized--.

Amend Claim 19, Column 22, Line 8, after the word "formed" delete "is" and insert --in--.

Signed and Sealed this
Twenty-first Day of January, 2020

Andrei Iancu
*Director of the United States Patent and Trademark Office*